United States Patent
Williams

(10) Patent No.: US 9,094,628 B2
(45) Date of Patent: Jul. 28, 2015

(54) ADDRESS MAPPED REPARTITIONED DIGITAL PIXEL

(71) Applicant: Raytheon Company, Waltham, MA (US)

(72) Inventor: Darin S. Williams, Tucson, AZ (US)

(73) Assignee: Raytheon Company, Waltham, MA (US)

(*) Notice: Subject to any disclaimer, the term of this patent is extended or adjusted under 35 U.S.C. 154(b) by 94 days.

(21) Appl. No.: 14/064,161

(22) Filed: Oct. 27, 2013

(65) Prior Publication Data

US 2015/0116564 A1    Apr. 30, 2015

(51) Int. Cl.
H04N 5/235    (2006.01)
H04N 5/3745   (2011.01)
H04N 5/347    (2011.01)

(52) U.S. Cl.
CPC ........... *H04N 5/37455* (2013.01); *H04N 5/347* (2013.01)

(58) Field of Classification Search
CPC ............................ H04N 5/3559; H04N 5/347
USPC .................................... 348/230.1, 231.1, 302
See application file for complete search history.

(56) References Cited

U.S. PATENT DOCUMENTS 7,881,495 B2    2/2011  Williams et al.
2012/0006971 A1 1/2012  Pflibsen et al.

OTHER PUBLICATIONS

Tyrrell et al , "Design Approaches for Digitally Dominated Active Pixel Sensors: Leveraging Moore's Law Scaling in Focal Plane Readout Design," Quantum Sensing and Nanophotonics Devices V. Proceedings of the SPIE, vol. 6900, 2008.
Burke et al, "The Orthogonal-Transfer Array: A New CCD Architecture for Astronomy," Proc. SPIE 5499, Optical and Infrared Detectors for Astronomy, 185 (Sep. 29, 2004).
Schultz, Ken, "Digital Focal Plane Technology," MIT Lincoln Laboratory, BMD JAC, May 15, 2008.
Janesick et al., "The future scientific CCD" SPIE vol. 501 State-of-the-art Imaging arrays and their applications (1984).

*Primary Examiner* — Usman Khan
(74) *Attorney, Agent, or Firm* — Eric A. Gifford

(57) ABSTRACT

By adding stabilization and super-sampling to a digital pixel readout integrated circuit (ROIC), line of sight motion, that is usually costly and difficult to control, instead becomes an ally, doubling the effective FPA resolution in some systems. The base repartitioned digital pixel architecture supplements analog signal accumulation with off-pixel digital accumulation, greatly increasing dynamic range. Adding address mapping and increasing the ratio of memory locations to pixels, enables stabilization and resolution enhancement. Additional stabilization at sub-frame intervals limits the effect of latency and simplifies complex address mapping. Pixels gains are compensated in-ROIC, without requiring multipliers. A unique partitioning of functions between the ROIC and subsequent logic allows pixel biases and non-isomorphic sampling effects to be compensated off-ROIC, reducing overall system complexity and power.

20 Claims, 12 Drawing Sheets

ADDRESS MAPPED REPARTITIONED DIGITAL PIXEL

CROSS-REFERENCE TO RELATED APPLICATIONS

This application is related to U.S. Utility application Ser. No. 13/866,066 entitled "REPARTITIONED DIGITAL PIXEL", filed on Apr. 19, 2013, which claims priority to U.S. Provisional Application No. 61/635,751 entitled "REPARTITIONED DIGITAL PIXEL" and filed on Apr. 19, 2012, the entire contents of which are

BACKGROUND OF THE INVENTION

1. Field of the Invention

This invention relates to a read out circuit for a detector array, and more particularly to an address mapped repartitioned digital pixel.

2. Description of the Related Art

A focal plane array (FPA) includes a two-dimensional detector array of detector elements, or pixels, typically organized by columns and rows and a read out integrated circuit (ROIC). The detector array and ROIC may be integrated into a single layer in which each cell includes a detector element and a readout circuit or may be separate layers in which each detector element is electrically coupled to a corresponding readout circuit.

It is common for the readout circuit within the pixel to be able to accumulate charge from a photo-diode, corresponding to the total flux of light of various wavelengths. Often, the charge is accumulated on a capacitive element that effectively integrates charge, producing a voltage, the voltage corresponding to the intensity of the flux over a given time interval called an integration interval. The photo-diode may be coupled to the capacitive element via a MOS transistor or direct injection gate that is biased with a voltage. A circuit element comprises circuitry capable of resetting the voltage of capacitive element back to an initial condition and circuitry capable of conveying a charge or voltage to a column (or row) wire for transfer to an output of array. This ROIC configuration is referred to here as an "analog pixel". Such a voltage or charge can be digitized by circuitry associated with the focal plane array resulting in binary values, at least one value for each pixel of the focal plane array. Thus, a focal plane array can be used to convert a two-dimensional pattern of flux into a two-dimensional array of binary values, such resulting array often called a digital image.

One variant of the analog pixel, sometime called "sub-frame accumulation" uses two integration capacitors in each pixel to extend the effective well capacity. Charge is initially accumulated onto a $1^{st}$ capacitor in each pixel and then, at some sub-frame rate, the signal is averaged with the secondary capacitor, then the primary capacitor is reset before continuing its accumulation. This has the effect of increasing the effective charge well capacity for better SNR. US 2012/0006971 discloses another variant in which the secondary capacitor in each pixel is replaced with analog storage in a separate CMOS device so that the averaging may be done in a radiation-hardened manner.

An Orthogonal Transfer FPA allows each pixel's charge to be shifted both vertically and horizontally on the array (Burke et al., "The Orthogonal-Transfer Array: A New CCD Architecture for Astronomy, Proc. SPIE 5499, Optical and Infrared Detectors for Astronomy, 185, Sep. 29, 2004). The ROIC includes additional transfer capacitors and control voltages to shift the pixel charge. An Orthogonal Transfer FPA enables "on-chip" frame summing, in which sub-frames are registered in response to a motion signal representative of the motion of the scene with respect to the FPA, so that summed-values from the same point in the scene are shifted between sub-frames to remain associated with the pixel where that point in the scene is currently imaged, and thus to reduce smearing within a frame. In the TDI operating mode of US 2012/0006971, the values in the CMOS layer are similarly shifted from each sub-frame to the next to provide image stabilization.

The effective amount of charge, (i.e., signal), that is accumulated by an analog pixel over an integration interval can be increased by the addition of a digital counter circuit thereby forming a "digital pixel". In some examples, each digital pixel is given a unique digital counter circuit. Additional circuitry can be added to the digital pixel to allow a predetermined amount of charge to be removed from the capacitive element of the pixel and correspondingly to increase the value of the digital counter by one count. Thus, over the lapsed period of time of an integration interval, the capacitive element of the pixel can integrate photo charge, a circuit within the pixel can remove predetermined quantities of charge, and a digital counter can count the number of charge removals, and thereby accumulate the applied signal. In this manner, the effective amount of signal that is accumulated by the digital pixel over an integration interval can be increased relative to an analog pixel because the digital counter extends the integration range of the capacitive element. The type of digital counter used can be of any logical variation, including binary, gray code, Linear-Feedback-Shift-Register (LFSR), or any other digital count circuit that can count charge removals. Furthermore, the relative sign of the signal accumulation may be plus or minus, relative to the charge, so that signal accumulation could be viewed as a charge addition in some cases and charge subtraction in others, possibly with the sign changing over time.

A class of pixel circuits called "digital pixels" also known as "in-pixel ADCs" are illustrated in FIG. 1. A focal plane array 100 includes a two-dimensional detector array 195 of detector elements, or pixels 190, organized by columns and rows, and a ROIC 102. It is common for a circuit within the pixel 190 to be able to accumulate charge from a photo-diode 105, corresponding to the flux 110 of light of various wavelengths. A common digital pixel circuit features a capacitive element 115 for integrating photo charge to produce a voltage, a MOS transistor or direct injection gate 120 biased with a voltage Vbias that couples photo-diode 105 to capacitive element 115, a comparator 125 which detects when the voltage exceeds a reference voltage Vref, a charge removal circuit 135 which removes a predetermined fixed amount of charge from the capacitive element 115, and a digital counter circuit 145 which increments each time an amount of charge is removed from the capacitive element. Reset logic 140 supplies a clock-type signal to the charge removal circuit 135, triggering the charge removal circuit to remove the predetermined amount of charge from the capacitive element 115 responsive to a signal from the comparator 125 indicating that the voltage across the capacitive elements has exceeded the reference voltage. With each charge removal/reset event, the digital counter 145 is incremented. The value of the digital counter 145 may be read out via a tri-state gate 150 on a data-out line 180, as shown in FIG. 1. Multiple other means of conveying the value of digital counter 145 to a set of outputs exist as alternatives to tri-state gate 150, as will be appreciated by those skilled in the art. For example, the values may be shifted out.

If "integrate-while-read" capability is required, then an additional set of digital storage elements or latches also have to be installed within the pixel 190. For example, latches may be connected between the digital counter 145 and tri-state gate 150. In integrate-while-read mode, at the end of an integration interval, the value of the digital counter 145 is copied to the digital storage element, preserving the values for read-out, for example, one row or one column at a time, and freeing up the digital counter 145 to be used for further counting of integrated charge.

In a common digital pixel circuit, the size of the capacitive element is often reduced to a relatively small value (for example, 1.0 femto-farads or 10 femto-farads) and the number of counter bits is some number of bits that results in a large range of count values, for example 16 bits. Correspondingly, the voltage range of the capacitive element 115 is often relatively small, for example 250 millivolts. In this configuration, the digital counter 145 can act as an analog-to-digital converter, resulting in the ability of the circuit of a pixel to perform analog-to-digital conversion and thus be referred to as an "in-pixel ADC" circuit. The predetermined amount of charge can also be called a "quanta" of charge. The charge removal from the capacitive element 115 may be a reset back to a first voltage using a simple device such as a MOSFET. The charge removal may also be a more complex circuit that removes a quantum of charge causing the capacitive element voltage to go from one value to a second value.

As described in Brian Tyrell et al. "Design Approaches for Digitally Dominated Active Pixel Sensors: Leveraging Moore's law Scaling in Focal Plane Readout Design" Quantum Sensing and Nanophotonics Devices V. Proceedings of the SPIE, Vol 6900 2008, in-pixel Orthogonal Transfer Structures can be incorporated into the digital FPA architecture. A multiplexed input is added to the counter/register structure to enable orthogonal transfer of digital data between adjacent pixels. As illustrated in FIG. 2, the digital data or "count" 200 in an FPA 202 moves left or right, up or down from one adjacent pixel 204 to the next. This in-pixel structure results in a large number (size of the array) of simultaneous register transfers that increases complexity and power consumption and produces a large noise spike.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present inventor recognized that the digital pixel architecture of co-pending U.S. Ser. No. 13/866,066 entitled "Repartitioned Digital Pixel", and specifically the off-pixel digital memory, could be beneficially utilized by introducing address mapping between the pixels and the digital memory. This address mapping provides a more robust stabilization than either Orthogonal Transfer or TDI (utilized in digital pixel architectures having in-pixel memory) to limit image smear and increases (double or more) the effective resolution of the detector array. The concept may be extended further by adding sub-frame accumulation, and off ROIC correction for pixel biases and accumulation duty factor.

The Repartitioned Digital Pixel provides a read out circuit for a focal plane array (FPA) of detector elements. The read out circuit comprises an array of pixel cells. Each of the pixel cells includes a storage device (e.g. a capacitor) coupled to a detector element and configured to accumulate a value in response to radiation impinging on the detector element, quantization circuitry configured to compare the accumulated value to a threshold value and generate a quantization event, a logical output configured to report the quantization event and a compensator circuit configured to reduce the accumulated value on the storage device to account for the reported quantization event. The read out circuit further comprises a digital memory (e.g. a counter) disposed physical separated from and coupled to the array of pixel cells. Each of the digital memory locations is in electrical communication with at least one of the pixel cells and configured to store and accumulate a digital value in response to receiving the quantization event from the at least one of the pixel cells. The digital value and accumulated digital value correspond, respectively, to an intensity of the radiation impinging upon the detector element of the at least one of the pixel cells for a given quantization event and for all quantization events over the frame integration interval. One of the novel and enabling aspects of Repartitioned Digital Pixel is that placement of the summing logic in the readout device (as opposed to off-FPA), even if on a different layer of a stacked device, hugely increases the available bandwidth for a given power. This enables the use of shared logic and memory, vs. dedicated accumulators per pixel in other architectures, to accumulate results at speeds consistent with processing individual quantization events. The system cost of implementing the same function and level of performance with off-device logic, as in conventional frame summing, would be highly prohibitive.

The present invention introduces an address mapping between the pixel cells and the off-pixel digital memory. In an embodiment, the address mapping is implemented with an address mapping input configured to receive updates to an address-mapping signal during a frame integration interval and a control circuit that is disposed physically separate from the array of pixel cells. The control circuit includes a shared quantization event selector configured to identify the pixels for which a quantization event (asynchronous or synchronous, and with single or multi-bit value) is reported and to initiate memory updates for those pixels. An address generator is configured to determine a memory location for each memory update based on the updated address-mapping signal. Memory update logic is configured to modify the digital value in the corresponding memory location for each memory update. Output logic is configured to output digital values accumulated over the frame integration interval from at least some of the memory locations. The control circuit can implement a generalized address mapping to provide more robust stabilization than orthogonal transfer or TDI. While TDI is typically limited to compensating for displacements in a single axis, and orthogonal transfer extends this to two axes, a generalized address mapping may also include rotation, scaling, and distortion correction. The control circuit may also implement the address mapping by mapping each pixel cell to one of multiple memory locations based on sub-pixel alignments to increase the effective resolution of the detector array.

In some embodiments, the address-mapping signal represents motion of a scene with respect to the array of detector pixels such that a point in the scene maps to the same memory location as that point moves across the detector pixels over the frame integration interval. In different embodiments, the address-mapping signal may represent an intentional relative motion to smear the scene across the detector to implement an anti-alias filter, or some other front-end analog smearing process.

In some embodiments, the address mapping is applied to the quantization events. The digital memory comprises quantization memory configured to store and accumulate digital values. The address generator is configured to determine the memory location in the quantization memory for each update. The memory update logic is configured to add the digital value corresponding to the reported quantization event for the pixel cell to the accumulated digital value in the corresponding memory location in the quantization memory for each memory update. The output logic is configured to output the digital values accumulated over the frame integration interval from at least some of the memory locations in the quantization memory. Application of address mapping to the quantization events allows for stabilization at very high update rates, perhaps at or near the native update rate of the detector and the incident radiation. The address mapping for quantization events may be a generalized mapping. In some embodiments, the mapping may be limited to an isomorphic mapping of linear shifts, possibly small linear shifts.

In some embodiments, the address mapping is applied to accumulated sub-frames. The digital values are stored and accumulated in the quantization memory over a sub-frame integration interval. Each pixel cell is mapped to one or more memory locations in the quantization memory. This mapping may or may not be updated during the sub-frame integration interval. The digital memory further comprises frame memory. The address generator is configured to compute a sub-frame mapping from memory locations in the quantization memory (corresponding to pixel cells in the array) to memory locations in frame memory for each sub-frame integration interval. The memory update logic is configured to accumulate the digital values from quantization memory accumulated over the sub-frame integration interval to existing digital values at the corresponding memory locations in frame memory at the sub-frame update rate (where the method of accumulation may depend upon a separate input, with addition being typical). This mapping typically is not updated over the sub-frame interval. The output logic is configured to output the digital values accumulated over the frame integration interval from at least some of the memory locations in the frame memory.

Application of address mapping to the accumulated sub-frame allows for on-FPA stabilization at sub-frame rates. The address mapping for accumulated sub-frames may be a generalized mapping configured to accommodate small or large shifts, roll, magnification, polynomial warp or keystone correction. In some embodiments, the sub-frame address mapping may be limited to a non-isomorphic mapping that excludes linear shifts. Because quantization events are accumulated before they are further accumulated into a sub-frame, sub-frame motion can be measured a posteriori, before the sub-frame address mapping is applied, avoiding extrapolation error and improving stabilization accuracy.

In some embodiments, address mapping is applied to both the quantization events and accumulated sub-frames. Address mapping may be applied to the quantization events at a high update rate to align data in the quantization memory as the digital values for reported quantization events are accumulated. This mapping may be confined to small shifts. Address mapping may be applied to the accumulated sub-frames to align data in the frame memory as the accumulated digital values are read out of the quantization memory at a lower sub-frame rate. This mapping may be a generalized mapping. This combination provides robust image stabilization and possibly resolution enhancement.

In some embodiments, the gain associated with different pixels may be different, and must be compensated before registration and summing. While it is typical to implement this operation as a multiply, this is not necessarily required for quantization event accumulation. A major insight for simplifying the circuit is that, for single-bit events, gain compensation may be achieved by setting the digital value corresponding to a reported quantization event for a given pixel equal to the pixel gain. In essence, the multiply is replaced by addition, as the one-bit events are distributed throughout the registered memory. Multi-bit events may easily be handled via successive addition or simplified few-bit shift-and-add (not typing up DSP slices in an FPGA).

In some embodiments, compensations for generalized address mapping or pixel non-uniformities may be performed in separate off-detector compensation logic. For a general address mapping, different memory locations may accumulate quantization events over different fractions of the frame integration interval, so that the apparent gain of the accumulated image is inconsistent from one memory location to the next. The compensation logic uses the address mapping signal to calculate a registered count for each memory location indicating a fraction of the frame integration interval over which pixel cells were accumulated into the memory location, and normalizes the output digital values by their corresponding registered count to maintain an approximately constant gain over the memory locations. For pixel non-uniformities, the compensation circuit is configured to apply the updated address-mapping signal to a bias map of the array of pixel cells to compute a registered bias for each memory location and to apply the registered bias to the digital values in the corresponding memory locations.

These and other features and advantages of the invention will be apparent to those skilled in the art from the following detailed description of preferred embodiments, taken together with the accompanying drawings, in which:

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF THE INVENTION

In its most general form, the present invention is a resolution enhancing/stabilizing FPA readout that can limit image smear and increase (double or more) the effective resolution of the FPA in terms of Nyquist sampling. Motion of the scene across the imaging detector (FPA) is typically a problem, producing smear and signal loss, so that system designers usually must go to painful lengths to stabilize the image on the FPA and prevent smear. The present invention allows smear to become an ally that enables resolution enhancement.

The present invention builds on the digital pixel architecture of Denham in co-pending U.S. Utility application Ser. No. 13/866,066 entitled "REPARTITIONED DIGITAL PIXEL". Each pixel in a typical readout collects energy from photons (or more generally radiation) hitting one detector element over an integration interval. The size of the collecting capacitor limits dynamic range and SNR. Denham extends the dynamic range by supplementing each capacitor with physically separated logic that keeps a digital record of the number of times that the capacitor is filled. The key insight here is that this configuration (as opposed to the in-pixel counters in the earlier digital pixel architectures) provides a framework for introducing stabilization and resolution enhancement via address mapping.

Figure 1:
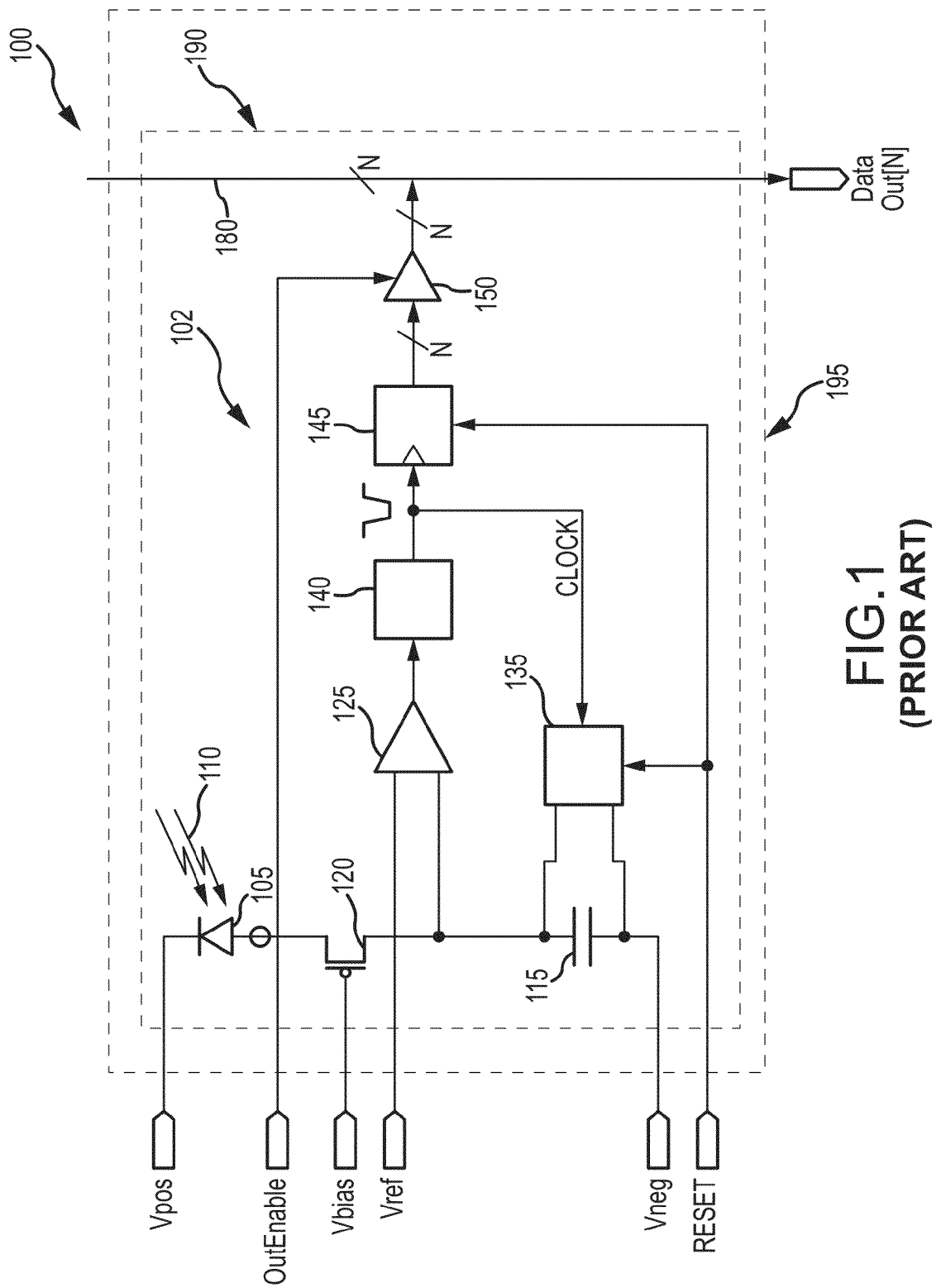
FIG. 1, as described above, is a block diagram of one example of a focal plane array including a digital pixel.
Figure 2:
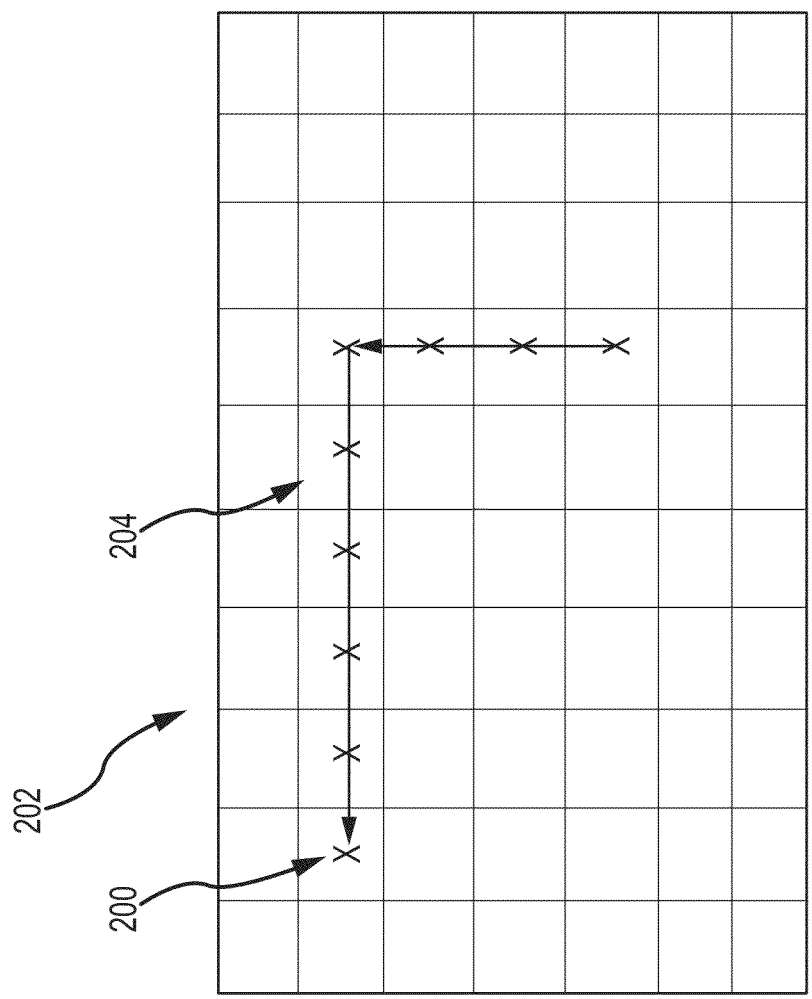
FIG. 2, as described above, is a diagram of a focal plane array via orthogonal transfer.
Figure 3:
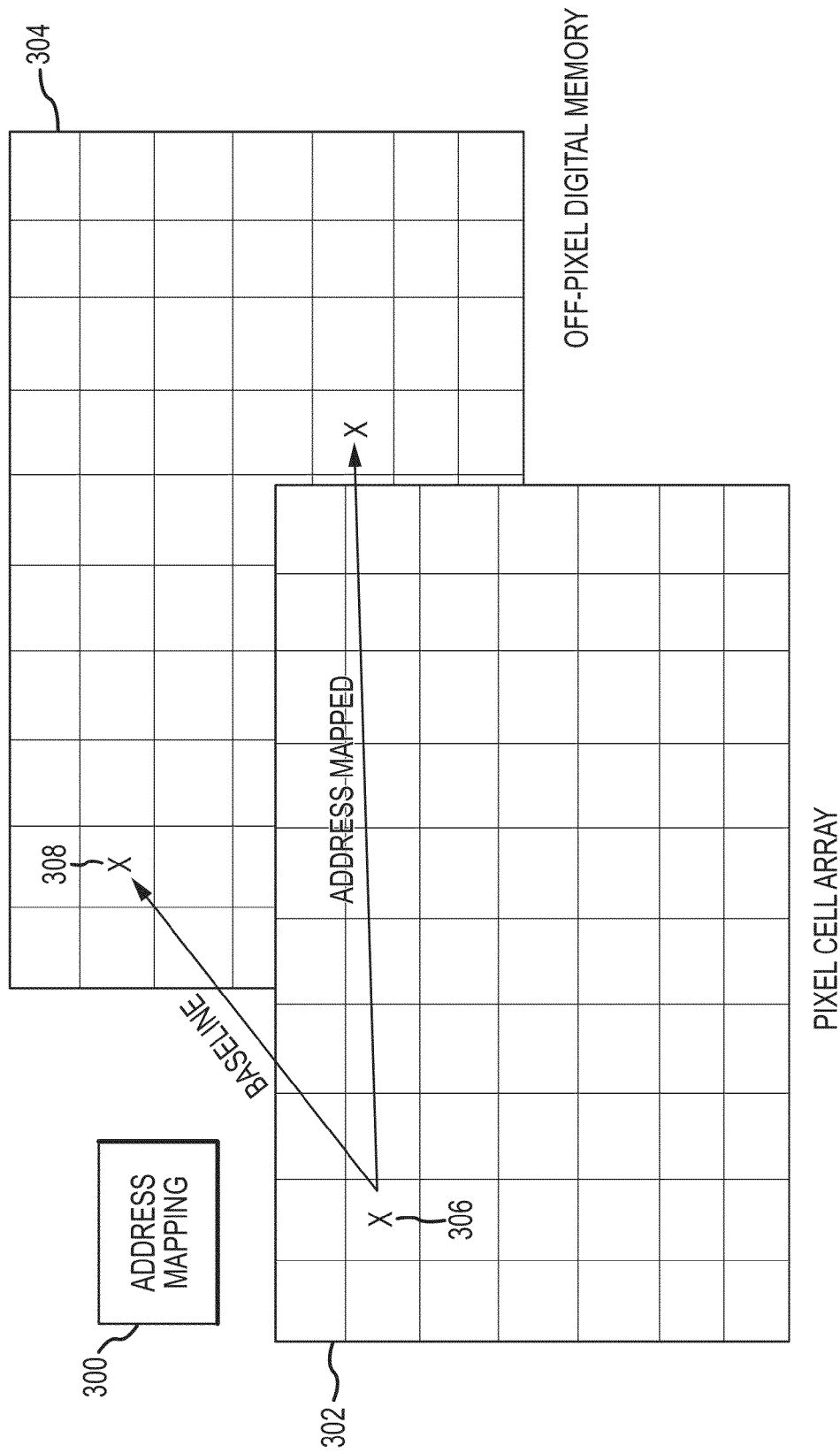
FIG. 3 is a diagram of a stabilized focal plane array including a repartitioned digital pixel stabilized via address mapping in accordance with embodiments of the present invention.

In the simplest form of the present invention as illustrated in FIG. 3, an address mapping 300 is added between the pixel cell array 302 and the digital storage 304. The mapping 300 specifies the mapping from a pixel cell 306 in the EPA to a memory location 308 in digital storage 304 at a point in time. The mapping at a given time may apply the same shift for all pixel cells, or the shift may vary from cell-to-cell, producing a general mapping. The mapping changes as the scene moves across the FPA during the integration time so that the different pixels that see the same point in the scene are accumulated to the same location in the memory. This provides a smear reduction effect comparable to time-delay integration (TDI), except more general. Various analog and digital detectors with in-pixel storage achieve a limited version of this effect by adding orthogonal transfer, so that the signal can be moved around to follow the incoming signal across the FPA.

The present design goes far further, by virtue of the separate memory that is not limited to a 1:1 or isomorphic relationship with the pixels. The term "isomorphic" is used here in the sense of retaining similar form or structure (vs. a literal 1:1 mapping), so that a contiguous rectangular patch of pixels maps to a contiguous rectangular patch of memory locations (as interpreted in 2-D), and is equivalent to a "shift". As used here, the term excludes changes in scale, flips, or orthogonal rotations.

As one example, the size of the memory can be doubled in each axis, with pixels being added into the address location which is on the closest ½ pixel boundary to where it is pointed in the scene, so that ¼ or less of the memory locations can be updated at any given position. Combined with pointing jitter, this allows super-sampling, as though the system PSF did not change but the pixel spacing (paradoxically) shrunk to ½ size. Supplementing this capability with a Ping-Pong memory and a second set of address mapping and summing extends flexibility further. This allows LOS motion to be measured before the correction is applied to the data, limiting extrapolation error. It also simplifies the application of more complex addressing such as roll and optical distortion correction.

Such complex addressing creates some serious complications, since different memory locations accumulate samples over different fractions of the integration time. But, this is handled through a variety of techniques, including a unique method of off-readout compensation to reduce total power and interface bandwidth loading. Finally, a set of unique approaches allow this to be done in the presence of FPA pixel non-uniformity by applying similar techniques to compensate for detector biases in the receiving logic, rather than demanding that this be handled within the readout. Combined, these techniques provide unprecedented flexibility in system design, relaxing some of the most severe system requirements while providing enhanced performance.

Figure 4:
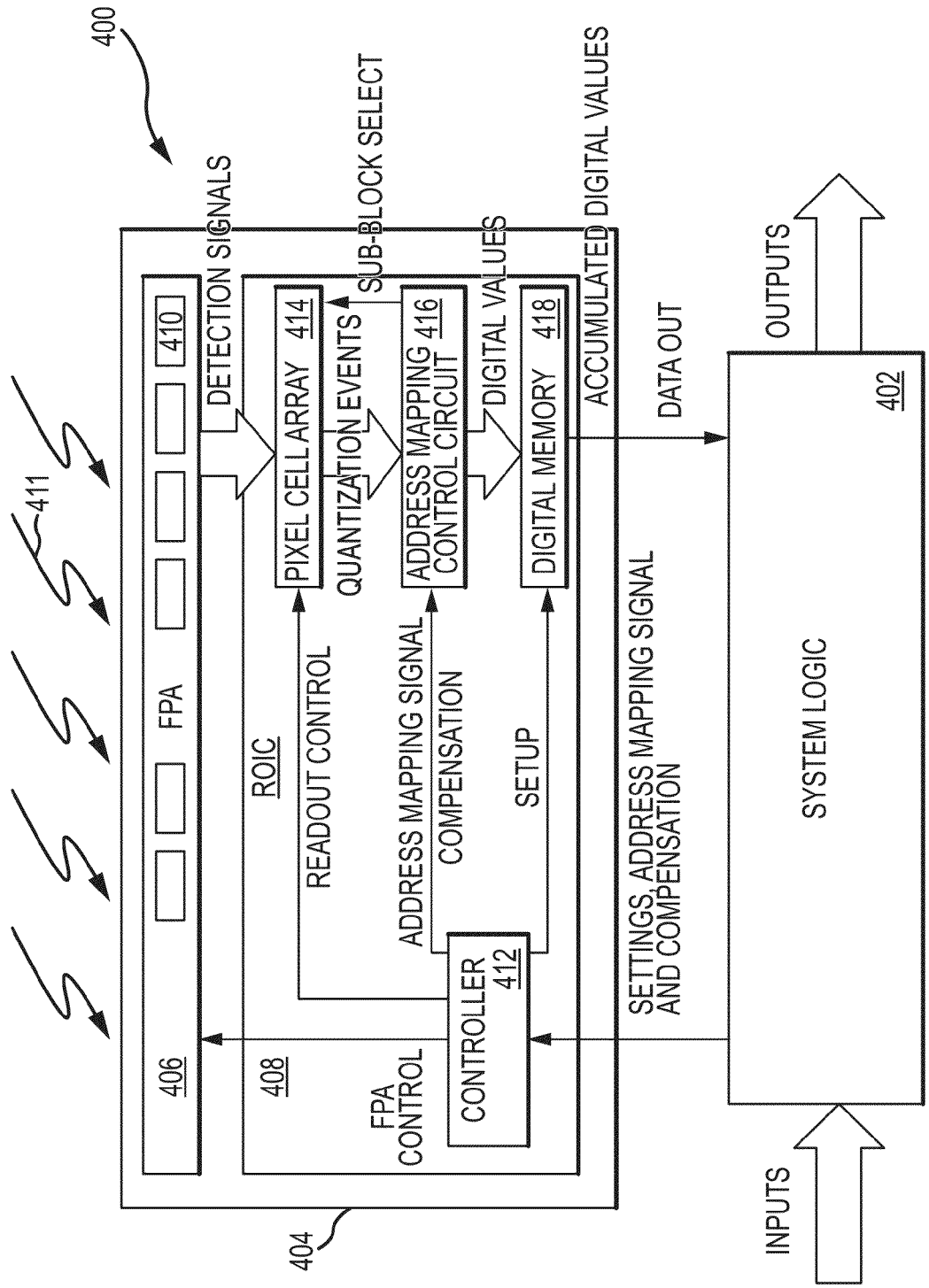
FIG. 4 is a block diagram of an embodiment of a stabilized focal plane array including a repartitioned digital pixel.

Referring now to FIG. 4, an embodiment of an imaging system 400 comprises system logic 402 and a detector assembly 404 including an FPA 406 and a ROIC 408. System logic 402 receives inputs including settings for programming the FPA 406 and the ROIC 408, one or motion signal inputs (e.g. target rate estimate and fast update inertial rates of the FPA) that together define the relative motion of the scene across the FPA 406 to provide the address mapping signal for stabilization control, and one or more inputs such as a dead pixel cell mask or pixel gain map that can be used together with the motion signals for compensation. System logic 402 routes the settings and address mapping signals, and possibly compensation, to detector assembly 404, which in response to incident radiation on FPA 406 reports out digital values accumulated over a frame integration interval (e.g. a digital image or portion thereof) back to the system logic. Non-uniformity Compensation (NUC) such as for gain or bias non-uniformities across the FPA, and count normalization, may be performed either "on-chip" (in the ROIC) or "off-chip" (in the system logic).

Conventional practice would suggest that off-readout compensation is not possible, since different pixels with different non-uniformities have already been combined together before the image leaves the readout. The enabling methods described here overcome that limitation. System logic 402 generates outputs of the normalized and compensated digital values accumulated over the frame integration interval (e.g. a fully-compensated stabilized, and possibly resolution enhanced, digital image).

Detector assembly 404 includes FPA 406 and ROIC 408. FPA 406 includes an array of detector elements 410. Each detector element 410 generates pixel signals in response to radiation 411 impinging on the element. For example, photo detectors generate a photo current in response to incident photons in a certain spectral band e.g. IR or visible. In this embodiment, FPA 406 is a separate device that is interfaced with ROIC 408. In other embodiments, the individual detector elements 410 may be integrated as part of ROIC 408. FPA 406 receives as inputs FPA control settings (e.g. bias voltages) via ROIC 408 and outputs the pixel signals back to the ROIC.

ROIC 408 includes a controller 412, a pixel cell array 414, an address mapping control circuit 416 and digital memory 418, both the control circuit 416 and digital memory 418 being "off-pixel", physically separated from pixel cell array 414. Controller 412 functions as an interface to distribute the settings, address mapping signal and compensation. In particular, controller 412 routes the FPA control signal to the FPA, a readout control signal to pixel cell array 414, the address mapping signal and compensation to control circuit 416 and a setup signals to digital memory 418.

Pixel cell array 414 is configured to accumulate values in response to the detection signals from the FPA, compare the accumulated values to a threshold value, generate and report out quantization events and reduce the accumulated values to account for the reported quantization event. The quantization events may be generated asynchronously when the accumulated value in a given pixel cell exceeds the threshold or synchronously when the comparator output is polled at a quantization event update rate. Quantization events may have single or multiple bit values. Pixel cell array 414 receives a sub-block select signal from control circuit 416 that selects the sub-block of pixels (where different sub-blocks share the same signal lines) to report out from a given block of pixels. For example, a block may have 32 lines of 256 pixels each. A sub-block may be a particular line of 256 pixels. Each pixel block may be suitably processed with a dedicated control circuit 416 and digital memory 418.

Control circuit 416 may map the pixel cells to memory locations in digital memory 418 so that a point in a scene that moves across the FPA maps to the same memory location over the frame integration interval. Control circuit identifies the pixels for which a quantization event is reported and for each pixel adds a digital value corresponding to the reported quantization event for that pixel cell to an existing digital value in the memory location in the digital memory 418. The digital values are accumulated each time a quantization event is reported. The control circuit will apply gain compensation, and possibly bias compensation and normalization, to the digital values. The accumulated digital values are read out for at least some of the memory locations at the frame integration interval.

The mapping may be applied to the quantization events to stabilize the image as the digital values are directly accumulated in the digital memory (quantization memory). The mapping may be updated at the sampling rate of the motion signals that form the address-mapping signal or may be extrapolated to a higher sampling rate, possibly at or near the update rate of the quantization events. For example, the sample rate of the motion signals may be in the kHz range whereas the update rate of the quantization events may be in the 10s to 100s of MHz. Application of address mapping to the quantization events allows for stabilization at very high update rates, perhaps at or near the native update rate of the detector and the incident radiation. When multiple pixel blocks are processed in parallel, the digital memory must either be sized to overlap enough to accommodate and shifts due to mapping (which are then merged on readout) or must be provided with a method for pixels to communicate between adjacent blocks (such as a crossbar switch). For this reason, quantization event address mapping may be preferably limited to small shifts.

The mapping may be applied to accumulated sub-frames to stabilize the image as the accumulated digital values are read out of the quantization memory and address mapped to frame memory. The mapping is suitably updated at the sub-frame rate. The address mapping for accumulated sub-frames may be a generalized mapping to accommodate small or large shifts, roll, magnification, polynomial warp or keystone correction. Motion can be measured before the address mapping is applied, limiting extrapolation error.

The mapping may be applied to both the quantization events and the accumulated sub-frames. This hybrid approach realizes simple shift stabilization at very high update rates and generalized stabilization at sub-frame rates.

The present design goes far further, by virtue of the separate memory that is not limited to a 1:1 or isomorphic relationship with the pixels. As one example, the size of the memory can be doubled in each axis, with pixels being added into the address location which is on the closest ½ pixel boundary to where it is pointed in the scene, so that ¼ or less of the memory locations can be updated at any given position. Combined with pointing jitter, this allows super-sampling, as though the system PSF did not change, but the pixel spacing shrunk to ½ size.

At the end of each frame integration interval, a residual charge may be left on the integration capacitive element. When quantized at a value-resolution smaller than the quantization event threshold, the residual may be used to improve the effective dynamic range of the system (maximum value divided by resolution), by merging it into the digitally accumulated values. This may be done on the FPA or the residual may be output separately and merged off-chip. When the residual is sampled only at the end of the frame interval, the spatial resolution of the residual is limited to the pixel resolution. When the digital accumulation is used in resolution enhancing modes, the residual may be replicated across output sub-pixels or distributed among them using sparse-reconstruction techniques to provide an improved balance between spatial and value resolution in the resulting image.

Figure 5:
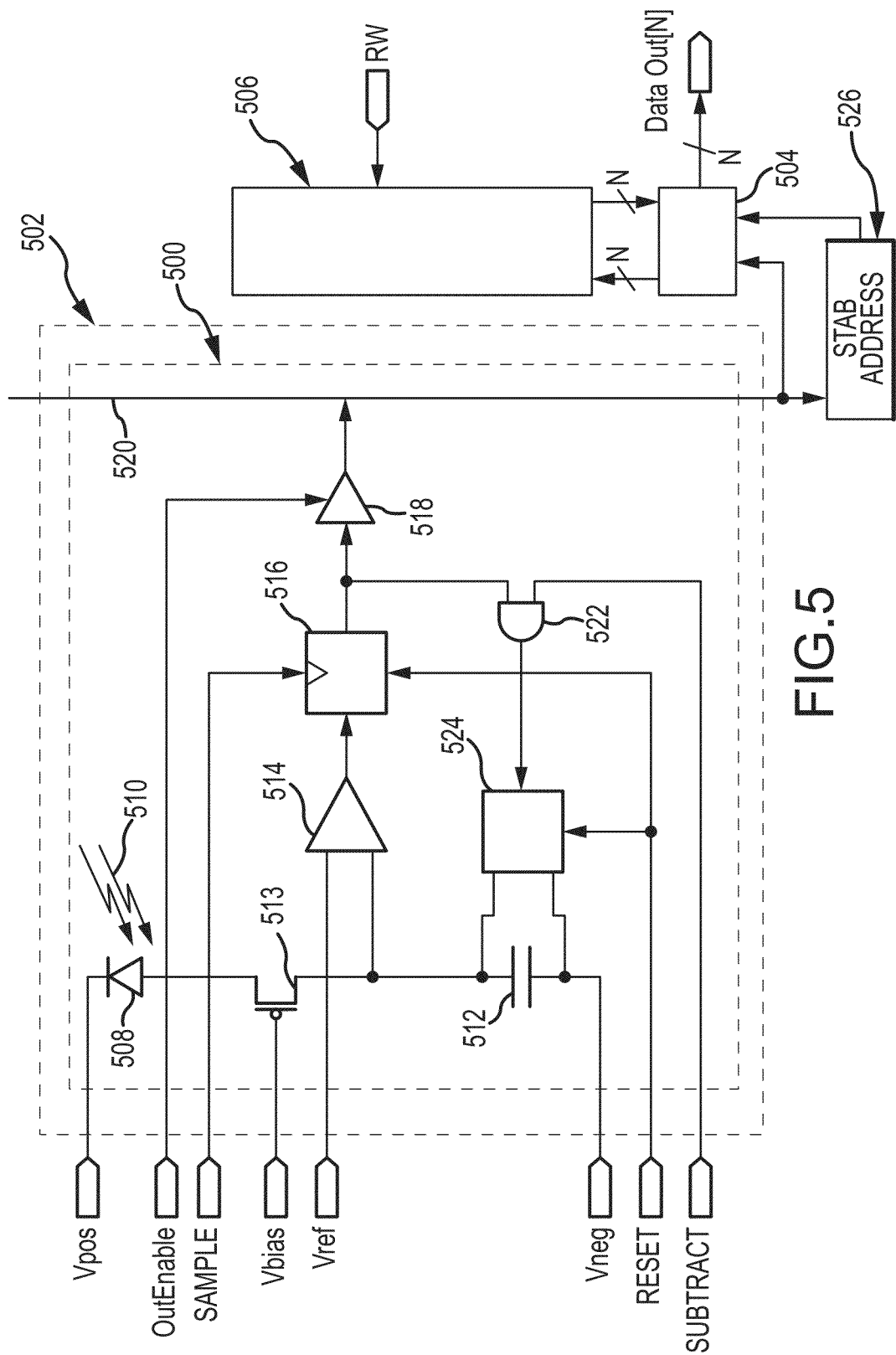
FIG. 5 is a block diagram of a focal plane array including a repartitioned digital pixel and address mapping logic.

FIG. 5 illustrates an embodiment of pixel cell 500 of an FPA 502 in communication with an address mapping control circuit 504 and a digital memory 506. Unlike conventional digital pixels in which the digital counter and associated digital circuitry are contained within the pixel, the address mapping control circuit 504 and the digital memory 506 are separately located from the FPA 502. In this embodiment, the detector element is a photo-detector that is integrated into the pixel cell of the ROIC. The quantization events are generated synchronously at a rate selected such that the total input flux corresponding to the quantization event threshold, times the minimum assured quantization event servicing interval, typically is not more than the maximum non-saturated input flux. This assures that quantization events are serviced before the pixel capacitor exceeds its capacity and saturates. Various other options are available, at the sacrifice of response linearity.

Each pixel 500 includes a photo-detector 508 that generates a photocurrent in response to incident photons 510. An integration capacitive element 512 accumulates charge from the photocurrent to produce a voltage. A MOS transistor or direct injection gate 513 biased with a voltage Vbias couples photo-detector 508 to capacitive element 512 A threshold comparator 514 detects when the voltage on capacitive element 512 exceeds a reference voltage (Vref) to switch its output. A latch 516 polls the output of threshold comparator 514 at an update rate provided by a "Sample" input (e.g. 100 MHz) to generate a quantization event. As previously discussed, synchronous sampling may sample pixels that do not meet the quantization event threshold on any particular cycle. These may be regarded equivalently as no-event, as an event with an inverted enable (suppressing updates), or as an event with a zero value. For simplicity, only the enable case is illustrated here, but this is to be interpreted as illustrative, not as restrictive. In an alternate embodiment, each quantization value may have multiple bits, indicating various levels of charge accumulated since the previous reported event. The average asynchronous rate is similar to the synchronous rate for the same dynamic range. When enabled, a tri-state gate 518 reports the quantization event on a data-out line 520.

Each pixel 500 may also include an AND gate 522 coupled between the latch 516 and a charge removal circuit 524. The AND gate 522 accepts as its inputs the signal from the latch 516 indicating that the charge on the integration capacitive element 512 has (or has not) exceeded the threshold defined by the comparator 512, as discussed above, and an external subtract signal, as shown. The output of the AND gate 522 is provided to the charge removal circuit 524 to trigger the charge removal circuit to extract a quanta of charge from the integration capacitive element 512. The quantization event indicative of a charge removal event is provided on line 520.

The quantization events and a stabilization address (STAB ADDRESS) 526 are provided to the address mapping control circuit 504. The stabilization address is determined by the address-mapping signal. The stabilization address may be an offset from a baseline address (no mapping) of the memory location associated with a pixel cell or may be the actual address of the memory location.

Control circuit 504 maps the pixel cells to memory locations in digital memory 506 so that a point in a scene that moves across the FPA maps to the same memory location over the frame integration interval. Control circuit 504 identifies the pixels for which a quantization event is reported and for each pixel adds a digital value corresponding to the reported quantization event for that pixel cell to an existing digital value in the memory location in the digital memory 506. The digital values are accumulated each time a quantization event is reported. The control circuit may apply gain compensation, and possibly bias compensation and normalization, to the digital values. The N-bit accumulated digital values are read out as DataOut[N] for at least some of the memory locations at the frame integration interval.

This organization, physically separating the array 502 of pixels 500 and their associated analog and charge-removal circuitry from the digital memory 506 and associated digital circuitry 504, may allow pixels to be arbitrarily mapped to memory locations in digital memory 506. This address mapping provides a more robust stabilization than either Orthogonal Transfer or TDI (utilized in digital pixel architectures having in-pixel memory) to limit image smear, and may increase (double or more) the effective resolution of the detector array.

This physical separation also creates more space in each pixel 500 for a larger integrating capacitive element 512 while allowing the pixel size to remain small. In one embodiment, the size of the imaging system ROIC may be, for example, approximately 31 microns by 25 microns. Further, separating the digital memory and components into a separate space permits the use of denser memory elements, for example, and/or more bits per pixel for improved resolution and performance of the imaging system.

The back-end circuitry (or digital elements) associated with each digital pixel 500, such as the address mapping control circuit 504 and digital memory 506, are located in a physically separate structure (referred to above as the second physical structure), which may or may not have an array format. For example, the second physical structure may be located spatially in a different silicon region of the ROIC near the pixel array to reduce the footprint area of the ROIC, or the second physical structure may fill available area regions of the ROIC to suit a particular need or die size. In other embodiments, the second physical structure may be disposed on a separate IC that is communicatively coupled to the ROIC of the FPA array 502, and may be interconnected using 3-D stacking techniques. Since the second physical structure is not necessarily hybridized to a detector array, the aspect ratio of the bits, registers, and other components is flexible and may be implemented in numerous different ways. Illustrative of the concept, the lower bits of digital memory 506 may be arranged on the same ROIC as the FPA while upper bits may be located on an adjacent IC or other circuit; such an arrangement may reduce output bandwidth and meet a die size constraint.

In one embodiment, the second physical structure, including the digital memory 506 associated with each pixel 500, can be organized in any manner, and may be implemented using digital memory such as SRAMs and/or register files. Thus, the digital circuitry may, for example, have the same logical organization as the FPA array 502 (e.g., 1920 by 1080 storage elements), or different logical organization. Such alternate organization may include redundancy for repair and yield improvement. Such alternate organization may include multiple memory locations for each pixel for resolution enhancement. The SRAM or Register Files may be organized in different layout patterns. This permits the area efficiency of the circuits that form the digital memory 506 and storage registers to be improved relative to conventional designs, both in terms of layout aspect ratio and overall density, than possible in conventional digital pixels.

Figure 6A:
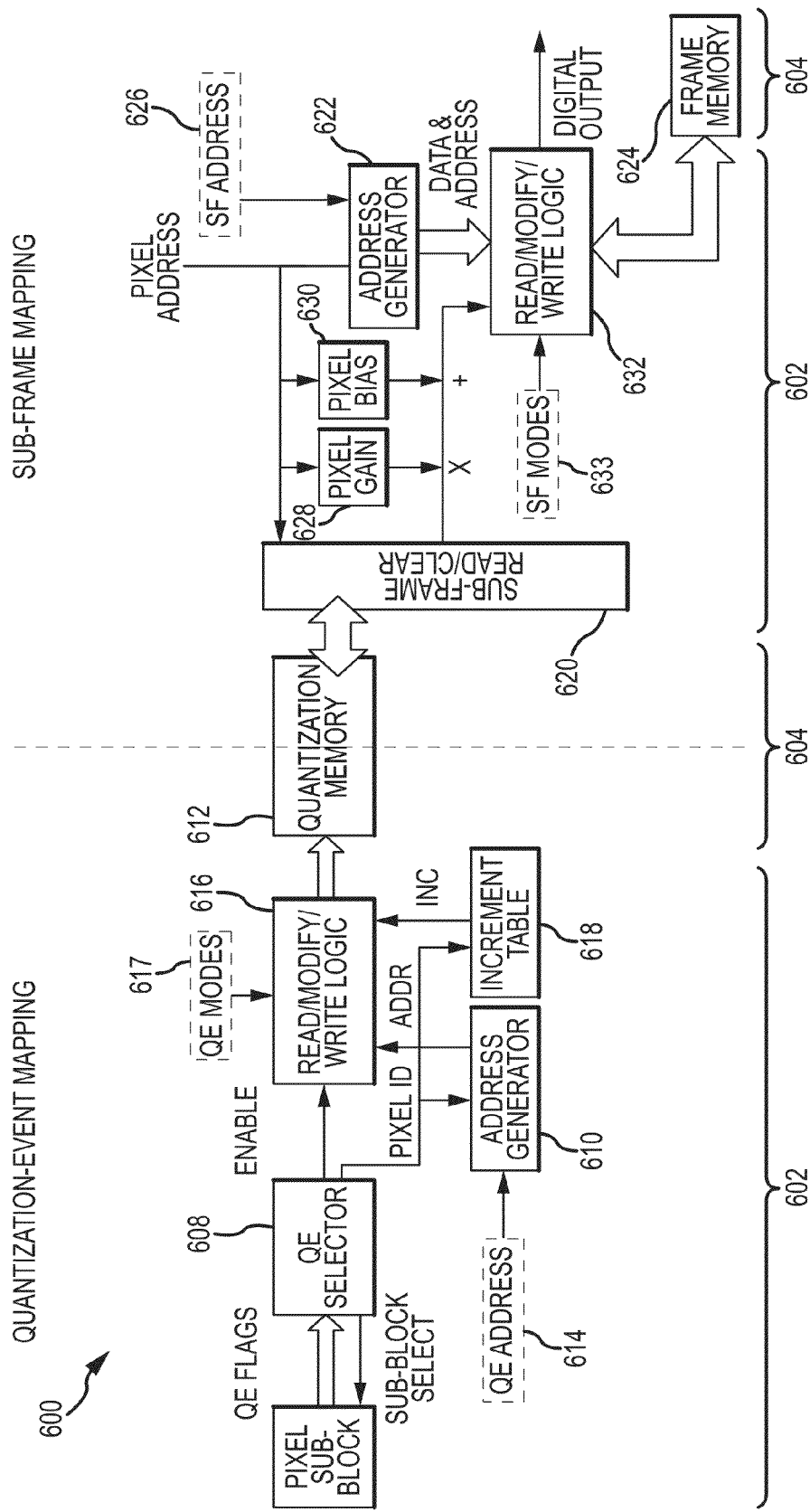
FIGS. 6a and 6b are a block diagram of an embodiment of a two-stage architecture for the address mapping logic and a timing diagram illustrating the frame, sub-frame, quantization event and address mapping signal rates.
Figure 6B:
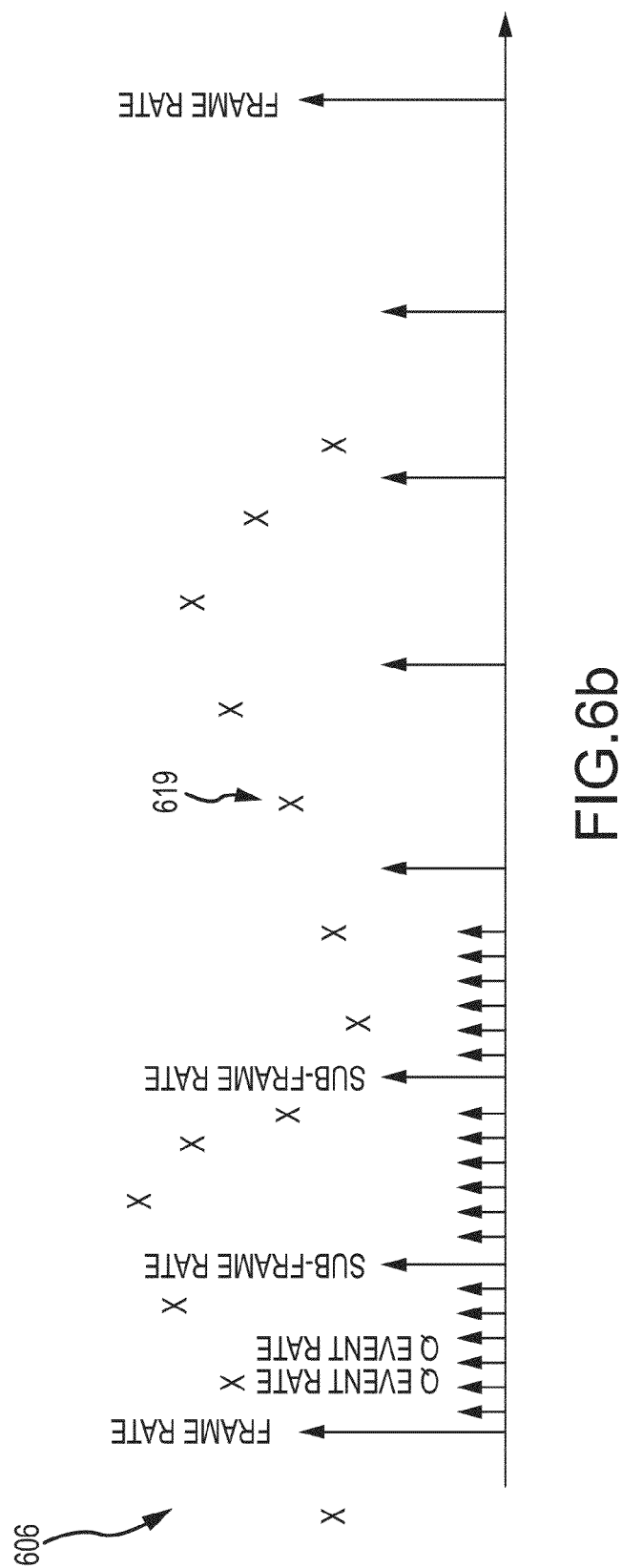

An embodiment of an architecture 600 for an off-pixel address mapping control circuit 602 and digital memory 604 and timing diagram 606 for an address-mapped repartitioned digital pixel is shown in FIGS. 6a and 6b. This architecture supports three different implementations of the address mapping: (1) Quantization Event (QE), (2) Sub-Frame (SF) and (3) a hybrid Quantization Event/Sub-Frame. In each case, digital values corresponding to the high rate quantization events are stored and accumulated in memory locations in digital memory. The difference resides in how the address mapping is applied. In case one, the address mapping is applied at the accumulation of the digital values for each quantization event. In case two, the address mapping is applied at the sub-frame readout of the accumulated digital values. In case three, different address mappings are applied for quantization events and accumulated sub-frames. Each of these implementations may be modified for resolution enhancement or off-chip compensation.

In a typical implementation, the array of pixels will be sub-divided into blocks and processed in parallel channels by identical instantiations of the control circuit 602 and digital memory 604. Within each channel, a block may have 32 lines of 256 pixels each. A sub-block may be a particular line of 256 pixels. The lines are processed sequentially within a channel.

Control circuit 602 sends a sub-block select signal to the pixel array, which returns the quantization events in the form of QE Flags. A shared QE selector 608 is configured to identify the pixels for which a quantization event is reported and to initiate memory updates for those pixels.

There are a number of different ways in which quantization events may be selected. They may be selected asynchronously, so that an event is triggered as soon as possible after an individual pixel has accumulated enough charge. They may also be selected synchronously, where the pixels within a group are rapidly scanned in sequence to determine whether each has reached the event threshold, while different groups of pixels are typically scanned in parallel. In the synchronous approach, it is somewhat arbitrary whether a pixel that has not met the threshold by the time it is scanned is viewed as "no event", or as an event with zero value. Pixels which have not yet passed the QE threshold may be handled equivalently by enabling memory updates only when the event value is non-zero (as shown in FIG. 6a), or by adding the value even when the value is zero (which is typically somewhat less power efficient). Such variations are obvious to one of normal skill in the art. Therefore, only the former case is represented here.

Similarly, there are different methods that may be used to handle charge arriving during the time between when a quantization event is identified and when it is processed. It may be ignored, or it may be accumulated (integrate-while-read) in any of several ways. The event value may be updated to reflect additional charge acquired before the event is processed (typically in integer fractions of the quantization event threshold, so that events have associated multi-bit values), or the additional charge may be left in the analog storage until the pixel is ready to signal another event. When the revisit time (from one event to the next in the same pixel) is less that the time required to fill the input capacitor at the maximum desired non-saturating flux level, this latter option can also produce multi-bit events.

With single bit events, the largest input that can be handled without saturation is flux level corresponding to the quantization event threshold divided by the event service interval, so that dynamic range scales with event update rate. Strictly for the sake of clarity, the remaining discussion focuses on the preferred embodiment of 1-bit synchronous selection with an enable. This is to be construed as illustrative, not as restrictive.

QE selector 608 generates an enable and a pixel ID for each QE. An address generator 610 is configured to determine an address in a quantization memory 612 for each identified pixel based on the pixel ID and a QE address (the address mapping signal) 614. Read/Modify/Write logic 616 is configured to accumulate the digital value corresponding to the reported quantization event for the pixel into an existing accumulated digital value in the corresponding memory location in the quantization memory for each memory update. The "mode" 617 of the QE determines the form of accumulation that may include addition, subtraction, alternating addition and subtraction, or other.

The digital value accumulated for an individual event may be the same for all pixels in the array. The digital value may simply be an integer value of one, to simply count the number of times the capacitor is reset. In other embodiments in which the pixels exhibit non-uniformity in gain, and gain compensation is required, an increment table 618 of digital values or "increments" for each pixel may be provided.

While it is typical to apply a gain as a multiply, this is not necessarily required for quantization event accumulation. A major insight for simplifying the circuit is that, for single-bit events, gain compensation may be achieved by setting the digital value corresponding to a reported quantization event for a given pixel equal to the pixel gain. In essence, the multiply has been replaced by addition, as the one-bit events are distributed throughout the registered memory. Multi-bit events may easily be handled via successive addition or simplified few-bit shift-and-add (not typing up DSP slices in an FPGA).

While the pixel gain may be used for normalizing DC response, it may also be used for other forms of pixel-by pixel weighting. DC response, or pixel bias compensation, is the embodiment shown here.

The increment table 618 is indexed by the pixel ID so that the correct digital value corresponding the pixel for a particular QE is added to the memory location in the quantization memory. For a simple count where the nominal value is one, the values in the increment table may, for example, vary from 0.9 to 1.1. In many cases it is preferable to use an offset form, so that the lowest gain for a non-dead pixel is 1, allowing the same precision to be represented with fewer bits. This form of gain compensation is performed with each memory update. In complete contradiction of standard practice, it actually becomes more efficient to implement the gain as an addition (with a different increment), because each single bit event may be added to a different memory location. In other embodiments, discussed subsequently, it may be more efficient to apply a conventional gain to the accumulated QE values during sub frame accumulation.

In a remarkably subtle change from conventional wisdom, pixel biases cannot as easily be corrected during QE accumulation, because the bias would have to accumulate at a fixed rate over time, while quantization events occur at a rate proportional to flux. This could be fixed by adding "pseudo events" on a fixed heartbeat with an increment related to the pixel bias, but subsequent descriptions provide a far easier and more efficient solution.

In some embodiment where multiple pixel blocks are processed in parallel, the quantization memory 612 must either be sized to overlap enough to accommodate and shifts due to mapping (with overlapping areas merged later) or must be provided with some method for communication between adjacent blocks (such as a crossbar switch). For this reason, quantization event address mapping may be preferably limited to small shifts to limit the amount of overlapping memory.

The digital values for each pixel cell are summed directly into the memory location in quantization memory corresponding to the point in the scene where the stabilization input (address mapping signal, QE Address) indicates that the pixel is currently point. A limitation is that calculation of the mapping signal typically involves motion measurements with some latency greater than the latency of the pixel data. Therefore the average mapping signal for each update must be predicted, which results in some degree of prediction error.

For Quantization Event Address Mapping, output logic is configured to output the digital values accumulated over the frame integration interval from at least some of the memory locations in the quantization memory 612. Application of address mapping to the quantization events allows for stabilization at very high update rates, perhaps at or near the native update rate of the detector and the incident radiation.

Referring now to FIG. 6b, for Quantization Event Address Mapping the digital values are mapped to memory locations in the quantization memory and accumulated at a QE update rate (e.g. 100 MHz). The address mapping (QE address) may be updated at the sampling rate (e.g. 2 KHz) of the constituent motion signals (samples 619) or, if the motion sensors provide both a position and a rate, extrapolated up to a higher sampling rate, possibly at or near the QE update rate. In certain applications the QE address may be updated for every memory update at the QE update rate.

QE Address mapping may be configured to operate in a resolution enhancing mode, where a single pixel of motion causes a displacement of more than one memory location of the 2-D mapping into the Quantization Memory 612. In the preferred embodiment this mapping is 1:N (typically 1:2) so that 1 pixel of linear motion across the pixels maps to N locations of address change in the Quantization memory 612. The degree of enhancement may be different for the two directions. In different embodiments this scale factor may be built in or may be selected as part of the address mapping.

In the preferred embodiment, each event is accumulated into a single memory location. For example, when operating with a 2× single-axis resolution enhancement, only ¼ of the memory location coving the area of the array would be updated at any given sub-pixel address. The others get filled in as the address mapping moves in sub-pixel increments, providing super-sampling.

When QE address mapping is used, the QE memory is typically somewhat oversized to allow for overlap and/or for resolution enhancement (to avoid the loss of pixels on the boundary). In some embodiments QE address mapping is not used, and the mapping of pixel to QE memory locations is 1:1, changing only for ping-pong buffers to allow read-while-integrate.

The multi-buffering to allow for integrate-while-read may be implemented as a separate buffer switch signal (typically ping pong), or as an address change into a dual port memory. Other alternatives will be readily apparent to one of normal skill in the art.

Sub-Frame Address Mapping is built on top of the quantization event architecture. It maps from locations in the quantization memory 612 to locations in the Frame Memory 624. The motion compensation provided by the QE address 614 may work in tandem with the sub-frame address mapping (typically providing a higher update rate to match a linear smear rate), or QE address mapping may simply be disabled or omitted in different embodiments In embodiments without resolution enhancement and with only isomorphic shifts for address mapping, the Frame Memory 624 would typically be oversized only enough to accommodate motion. Superficially, it appears that there is no purpose for allowing both QE and SF address mapping in this configuration, since they do exactly the same thing. However, they do so with different measurement latency. This configuration may still be advantageous for allowing the sub-frame mapping to piece-wise correct for prediction errors in the QE mapping that have already been accumulated into the QE memory, providing on overall reduction in smear.

Resolution enhancement in sub-frame addressing has a different meaning than in the QE addressing: QE addressing maps from pixels to QE memory locations, while SF addressing maps from QE memory locations to Frame Memory locations. Thus, scale factor changes between the two are multiplicative. That is, a 2:1 oversampling in the QE address mapping followed by a 1.5:1 oversampling in the Frame Memory addressing would produce an overall 3:1 oversampling of pixels to the Frame Memory.

In the preferred embodiment, the Quantization Memory 612 is sized to allow for 2:1 oversampling, and the Frame Memory 624 is sized for the same resolution (that is, for no additional resolution enhancement). But, since the SF address mapping is more general, it still retains limited ability to globally or locally alter the SF resolution (to more or less than 1:1).

In the preferred embodiment, the Frame Memory 624 is sized to allow for motion, and for resolution enhancement (so that a single pixel of motion causes the mapping into the 2-D memory space to move by more than one memory location, typically by 2 or more).

Sub-Frame Read/Clear logic 620 reads out the accumulated digital values for a pixel sub-block out of quantization memory 612 at the sub-frame rate. An address generator 622 is configured to determine an address in a frame memory 624 for each pixel address (memory location in quantization memory) based on a SF address (the address mapping signal) 626. Each accumulated digital value may multiplied by a pixel gain 628 and added to a pixel bias 630 to compensate the digital value. Note, however, that this is typically only useful in the absence of SF address mapping, when QE Memory locations correspond 1:1 with pixels. Read/Modify/Write logic 632 is configured to execute an SF Mode 633 that determines the form of accumulation which may include addition, subtraction, alternating addition and subtraction, or other and accumulate the compensated digital value to an existing digital value in the corresponding memory location in the frame memory for each sub-frame update. The address mapping for accumulated sub-frames may be a generalized mapping ("non-isomorphic") to accommodate small or large shifts, roll, magnification, polynomial warp or keystone correction. Motion can be measured before the address mapping is applied, limiting extrapolation error. Output logic is configured to output the digital values accumulated over the frame integration interval from at least some of the memory locations in the frame memory 624.

In some embodiments, particularly where QE address mapping is omitted, it may be desirable to omit the increment table 618, and instead apply pixels gains 628, and possibly also pixel biases 630, during sub-frame mapping (since each Quantization Memory 612 location then contains data from only a single pixel).

When QE address mapping is enabled, this is more complicated since a single Quantization memory location may contain values from different pixels. In that case the preferred embodiment is to correct for pixels gains in QE accumulation. Pixels biases may be corrected during SF accumulation using methods subsequently described for post-processing.

The prediction error inherent in Quantization Event Address Mapping can be avoided or, to some extent, counteracted in Sub-Frame Address Mapping because the accumulated digital values in quantization memory (temporary buffer) are added into a registered sum image in the frame memory after the end of the sub-frame interval when a correct motion measurement, hence SF address, can be determined a posteriori.

In an embodiment, the quantization memory comprises two temporary buffers, each with a value for each pixel (essentially, two "Ping-Pong" image buffers, although more than two may be used) so that digital values can continue to be accumulated for a sub-frame while the previous sub-frame values are being dispersed into the registered-sum frame memory. In another embodiment, collection of input photons (accumulation in quantization memory) may be suspended while the previous temporary storage is dispersed into the appropriate registered locations, or electronics may continue to be accumulated in the capacitor and captured as part of the residual A/D at the end of the sub-frame. The sub-frame residuals may also be added into the temporary frame (with appropriate scaling), or output separately.

More particularly, in a first embodiment, the digital values for the selected quantization events are accumulated into a first temporary frame. The accumulated digital values for the just completed sub-frame are read out and added to the addressed mapped memory location in frame memory while the digital values for the next selected quantization events are accumulated into a second temporary frame while the digital values in the first temporary frame are distributed to the registered memory locations in frame. This continues by ping ponging between the first and second temporary frames. At the end of the integration period, the registered memory locations are output and frame residuals are and output separately.

In a second embodiment, the digital values for the selected quantization events are accumulated into a temporary frame. The accumulated digital values for the just completed sub-frame are read out and added to the addressed mapped memory location in frame memory. The digital values in the temporary frame are distributed to the registered memory locations in frame and the process repeats. At the end of the integration period, the registered memory locations are output and frame residuals are and output separately.

Major simplifications of the SF address mapping logic may be achieved by calculating pixel addresses in sequence. For example, the logic keeps track of address and intermediate values for the pixel denoted P(r,c), where "r" is row and "c" is column, and uses these to calculate P(r,c+1). Similarly, values for P(r,1) are used to calculate P(r+1,1), so that intermediate value need only be saved for the previous pixel, and the $1^{st}$ pixel of the previous line. For example, a $3^{rd}$ order polynomial address mapping is generally the minimum necessary to represent typical optical distortions (pin-cushion, barrel), but this is very logic intensive when done directly as a third order function. Instead, the $3^{rd}$ order term in the polynomial address mapping, $(r+1)^3$ may be represented as $r^3+3\ r^2+3\ r+1$, and similarly for the $2^{nd}$ and $1^{st}$ order terms. All of these values are derivable by just shifting and adding the preceding values. Hence, even complex addressing can be done without any "multiply" operations when applied at the sub-frame, where pixels can be read out in sequence.

Calculation of the memory locations in frame memory in pixel sequences greatly simplifies the implementation of non-isomorphic mappings e.g. roll, magnification, polynomial warp or keystone correction.

Referring now to FIG. 6b, for Sub-Frame Address Mapping the accumulated digital values in the quantization memory are mapped to memory locations in the frame memory and accumulated at a SF update rate (e.g. 500 Hz). In the preferred embodiment, the SF address is suitably updated at the sub-frame rate so that the mapping is constant over the entire sub-frame.

Hybrid Quantization Event/Sub-Frame combines the Quantization Event Mapping and Sub-Frame Mapping. Conceptually, to implement Hybrid address mapping one simply enables the QE Address input to the Quantization Event mapping to perform stabilization on the accumulated quantization events. A Hybrid implementation may perform a small shift on the accumulated quantization events at the memory update rate (e.g. the KHz sampling rate of the motion inputs up to the MHz update rate of the pixel cell array) and may perform a generalized mapping (roll, magnification, warp) at the sub-frame rate (e.g. a few hundred Hz) for a frame read out at, for example, 60 Hz. In one application this may be thought of as breaking the offsets applied to each pixel over time into a piece-wise linear curve, where the QE mapping applies the linear segments based on predicted rates at the start of the sub-frame, changing the offset at an effectively continuous rate, while the SF addressing realigns the segment end points a posteriori and handles the more complicated non-linear changes. This combination provides a flexible and robust stabilization of the image during each frame.

It is important to note that any specific embodiment may not include all of the elements in FIG. 6. It may retain only those necessary for the particular application, or it may retain the subset of components necessary for several applications, and turn off, bypass, or set to null-effect those not needed for the current application.

Figure 7A:
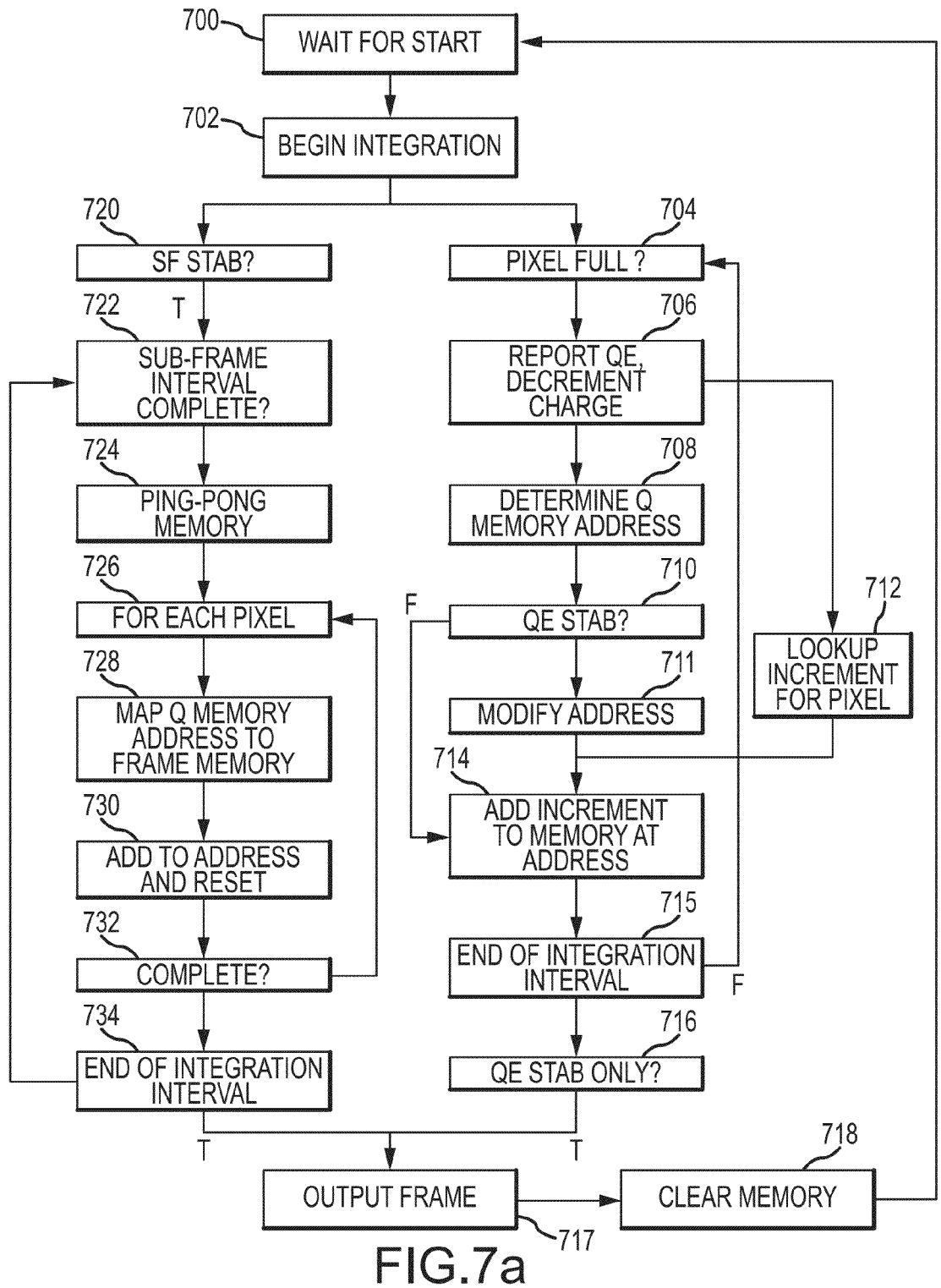
FIGS. 7a-7c are flow diagrams for the two-stage architecture.
Figure 7B:
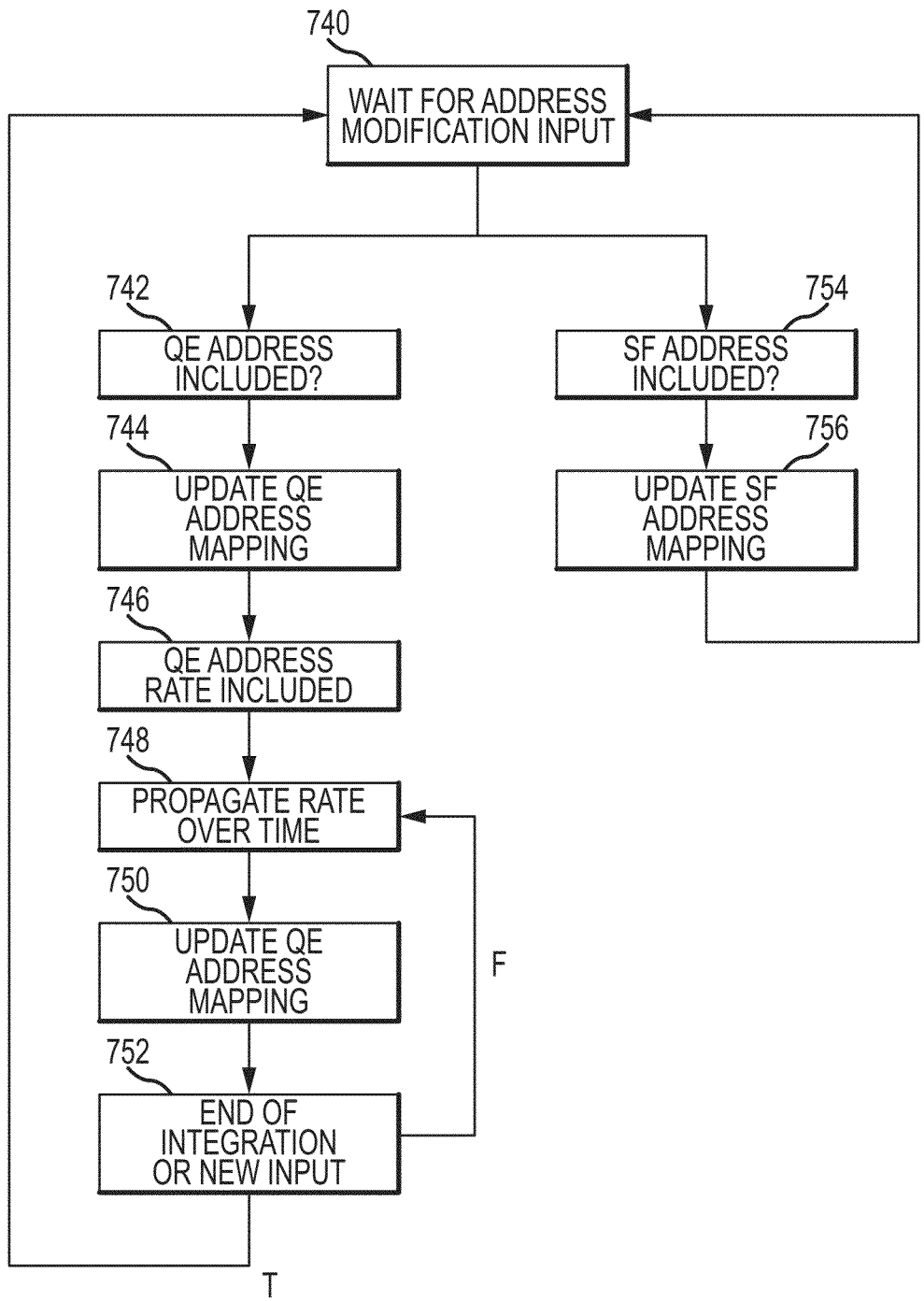
Figure 7C:
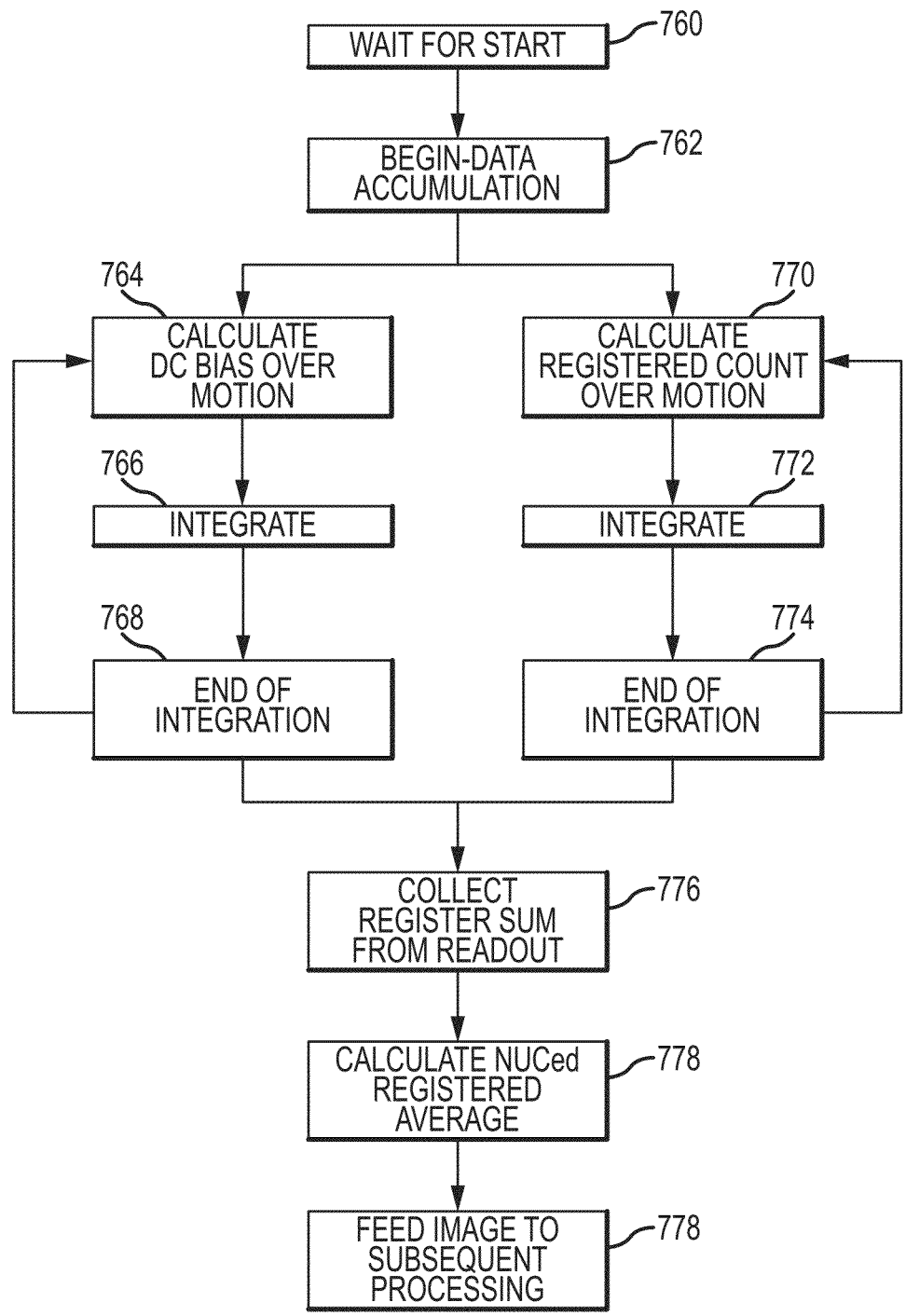

The method utilized by the address mapped repartitioned digital pixel are depicted in FIG. 7. The three figures represent different portions of the process as occurring independently and in parallel. This is intended for illustration, not as restrictive. The processes may equivalently be gathered into a single nested timing loop. FIGS. 7a-7c depict the quantization and sub-frame stabilization, asynchronous process for updating the address mappings and the compensation processes for pixel array gain and bias non-uniformities and normalization, respectively.

Referring now to FIG. 7a, the process waits for start (step 700) and then begins integration (step 702). An inner loop executes at the memory update rate (e.g. 100 MHz), and possibly in parallel for different blocks as described previously, by first determining if a pixel is full (step 704). If yes, the process reports a quantization event (QE) and decrements the charge on the pixel (step 706). The process determines the quantization memory address for each pixel for which a QE is reported (step 708). If QE stabilization is enabled (step 710), the process modifies the quantization memory address in accordance with scene motion as provided by a QE address (step 711). The process looks up an increment corresponding to the pixel for each memory update (step 712) and adds the increment to the existing digital value at the corresponding memory address (714). The process repeats until the end of the integration interval is reached (step 715). If the process is running QE stabilization and only QE stabilization (step 716), the process reads out the accumulated digital values for at least some of the memory locations in quantization memory into an output frame at the frame rate (step 717), clears the digital memory (step 718) and repeats the process for the next frame.

While the preceding describes synchronous event selection, it is also accurate for asynchronous selection, except that the inner loop would then be construed as operating on an event-driven basis, at up to the maximum memory update bandwidth. It is also essentially correct for hybrid event selection methods, where events are collected asynchronously at one level and polled at another. A variety of adaptations should be obvious to one of normal skill in the art.

If SF stabilization is enabled (step 720), for either sub-frame event or hybrid event address mapping, an outer loop executes at the sub-frame rate (e.g. 500 Hz). At the end of each sub-frame interval (step 722), the accumulated digital values in the quantization memory are swapped between temporary buffers (Ping-Pong memory) so that the values may be read out while the digital values for the next sub-frame are accumulated (step 724). When integrate-while-read is not required the second half of the ping-pong may be regarded as a dump, where values are discarded until switching back. For each pixel (step 726), the process maps the Q memory address to a frame memory address in accordance with scene motion provided by a SF address (step 728), adds the accumulated digital value to an existing digital value from the previous sub-frame (step 730), and resets. The process repeats until all pixels have been read out and accumulated at the sub-frame rate (step 732). The process repeats until the end of the frame integration interval (step 734). The process reads out the accumulated digital values for at least some of the memory locations in frame memory into an output frame at the frame rate (step 717), clears the digital memory (step 718) and repeats the process for the next step.

Referring now to FIG. 7b, a process for generating updates to the address mapping signals QE address and SF address runs asynchronous with the synchronous inner and outer loops for QE and SF stabilization. The process waits for an address modification input (step 740). The motion signal inputs that make up the address-mapping signal may, for example, be sampled at 2 KHz. If QE event stabilization is enabled and a QE address is included (step 742), the QE address mapping for each reported quantization event is updated (step 744). If a rate is included with the QE address position (step 746), the rate can be propagated over time (step 748) to extrapolate the QE address for memory updates between address modification updates (step 750). This effectively extrapolates the sampling rate of the motion signals to a higher update rate, perhaps at or near the memory update rate of the quantization process. The rate may be propagated until the end of the integration interval is reached or a new address modification input is received (step 752). The process repeats for each new address modification input. If SF stabilization is enabled and a SF address is included (step 754), the SF address mapping for each pixel is updated (step 756). The SF address mapping for the current sub-frame is typically fixed and not updated during the sub-frame. This may equivalently be implemented with synchronous inputs at a specified rate, with hierarchical messages so that less input bandwidth is taken for the faster messages, or with entirely different inputs for SF and QE address updates. For example, +/−body inertial angle motion measurement quanta may be input to the address mapping as a direct digital stream, while the portion due to target inertial motion s input and merged separately. Such variations would be readily apparent to one of normal skill in the art, and are not detailed here.

Referring now to FIG. 7c, in different embodiments compensation may be applied to correct for non-uniformities in pixel response and to normalize collected values. In this embodiment, compensation data is calculated for a current frame while the compensation data from the previous frame is applied to the accumulated digital values from the previous frame. The process waits for a frame integration to start (step 760) and beings data accumulation (step 762). The process uses a bias map for the pixel cell array to calculate DC bias over motion (step 764), integrates (step 766) until the end of the integration interval (step 768) and repeats. The process calculates a registered count for each memory location in the digital memory over motion (step 770), integrates (step 772) until the end of the integration interval (step 774) and repeats. The process collects the registered sum image from the readout circuit (step 776), applies the registered bias and registered count to the registered image to calculate a non-uniform compensated (NUCed) registered average image (step 778) and feeds that image to subsequent processing (step 780). In the preferred implementation, this portion of the process occurs outside of the readout ROIC, in the circuitry which receives the registered images. However, an equivalent process may be applied as part of the pixel bias correction 630 in generating the registered images.

Figure 8:
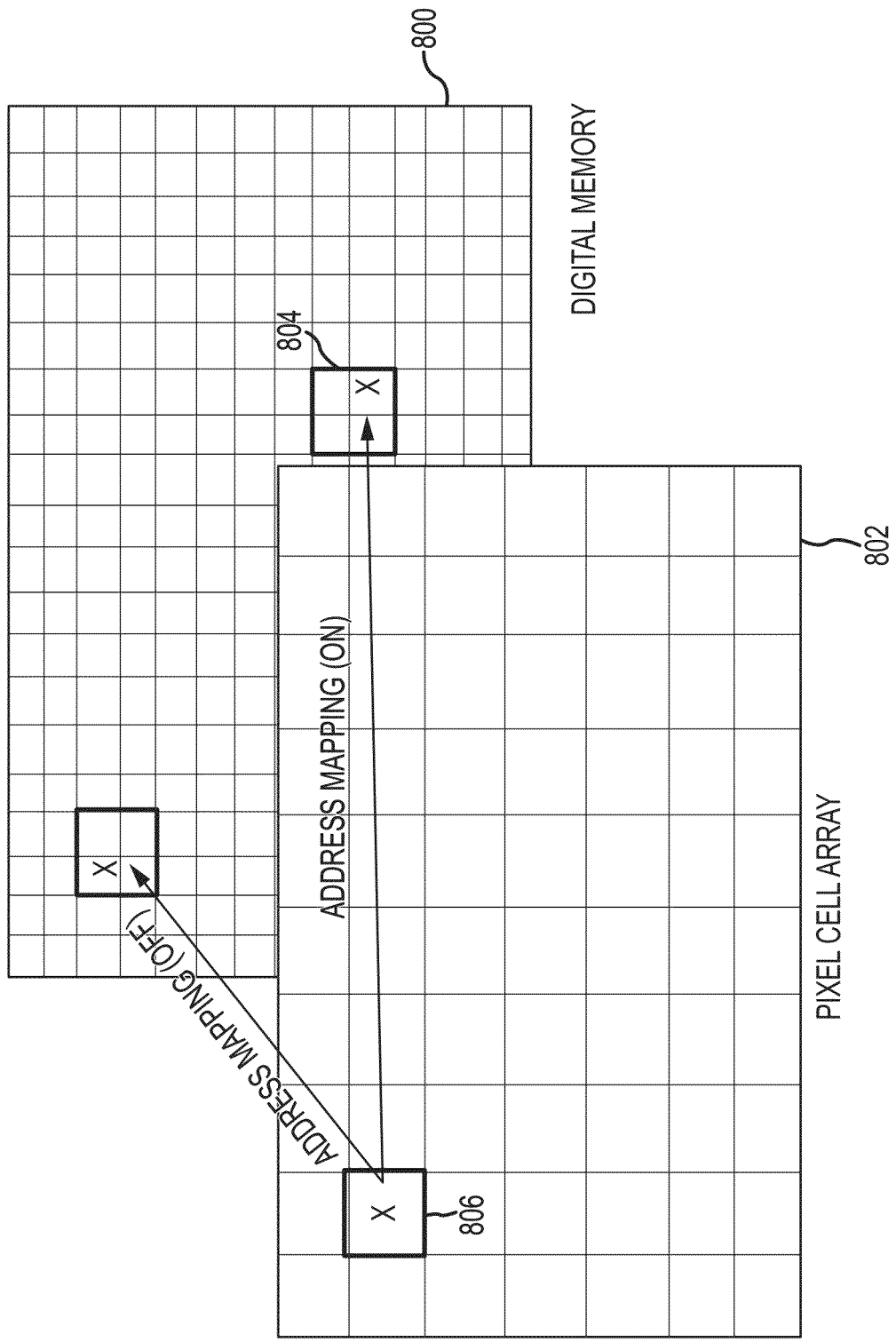
FIG. 8 is a diagram illustrating resolution enhanced stabilization.

Referring now to FIG. 8, in different embodiments, including QE mapping, SF mapping or Hybrid QE/SF mapping, stabilized address mapping in combination with the off-pixel digital memory may be exploited to achieve resolution enhancement. The present invention allows smear to become an ally that enables resolution enhancement. The key insight here is that this configuration (as opposed to the in-pixel counters in the earlier digital pixel architectures) provides a framework for introducing stabilization and resolution enhancement via, address mapping.

By virtue of physically separating the digital memory 800 from the pixel cell array 802, the memory locations 804 in digital memory 800 are not limited to a 1:1 relationship (or any other integer multiple relationship) with the pixels 806 in pixel cell array 802. As one example, the size of the memory can be doubled in each axis, with pixels being added into the address location which is on the closest ½ pixel boundary to where it is pointed in the scene, so that ¼ or less of the memory locations can be updated at any given position. Combined with pointing jitter, this allows super-sampling, as though the system PSF did not change, but the pixel spacing shrunk to ½ size.

The most straightforward of super-sampling doubles the effective resolution without effective impact on memory bandwidth. Other integer multiples could be used, particularly if the optical system is severely undersampled, but doubling is sufficient to recover almost all of the lost information for most systems. In this form, the "registration" is done at 1/N pixel resolution (typically N=2), with a separate set of addresses for each 1/N step (H and V), so that there are N^2 counters per pixel input pixel (excluding the boundary issues discussed previously), with the selection of which N^2 counters are used depending upon the shift value in the simplest case. In generalized mapping, each pixel may be mapped to whatever memory location is at nearest to the exact desired address (effectively quantizing to 1/N). The data is accumulated at the commanded fractional pixel registration.

This can be done several ways . . . . In one embodiment each input pixel is replicated and summed into each of the N^2 counters it covers (which preserves scaling and allows resolution enhancement beyond the input image Nyquist). Alternatively, an interpolated value of the input pixel may be summed into each of these counters (which is far more complicated and tends to reduce the output bandwidth, but produces benefits in some situations). Or, the preferred approach, the input image is summed into only the set of counters at the current sub-pixel phase.

This would appear to create normalization problems, since each sub-phase can have a different number of samples. But this is easily handled. In one form, a record is kept of the number of frames accumulated to each sub-pixel registration. This can be used after accumulation is completed to renormalize the pixel values, either within the readout or in subsequent processing. Since the summed mask is easily reconstructed from the image motion profile, it is easily done off-FPA. In some cases, when the address mapping is restricted only to shifts, a simpler approach is sufficient. An N×N boxcar filter is applied to the data as it is read out (on or off FPA). This preserves much of the resolution enhancement (due to reduced aliasing), while assuring the same overall gain on all pixels within the full overlap region of the motion. This approach will cause the apparent pixel gain to fall off at the edges of the array in regions where the pixels do not fully overlap during the entire accumulation interval. This can be handled in any number of ways including oversizing the detector and discarding edges, accumulating a map or correction factor for the edges (either in the readout or separately from motion commands), or just disregarding it (which is usually acceptable for displayed images).

In some applications, pathological cases can sometimes occur, where not all of the sub-pixel phases have any samples or enough samples to provide adequate SNR compared to their neighbors. Additional logic may be added to detect individual phases where this occurs, and to substitute values blended from the neighboring phases, or a better compromise between resolution and SNR. In the simplified case of the N×N boxcar this is handled implicitly.

The next step is to handle pixel response non-uniformities. Compensation for biases is easily handled through superposition, recognizing that the desired bias compensation for the enhanced resolution image is simply the replicated pixel biases filtered by the image motion, which can easily be done in the destination processor.

Compensating for gains this way is less straightforward and less accurate. In the case where the readout is being used to stabilize a constant input image, each point in the output 2× resolution image is nominally looking at the same input throughout the accumulation time. Thus, the overall gain at that point is the filtered version of the gains of the individual contributing pixels, as above for the offsets. In some cases this can provide an adequate compensation off FPA.

But, this is only approximate. Aliased scene content, registration error, and temporal changes in the scene violate the assumption that the pixel input is stationary, and produce compensation errors. Furthermore, when the best possible output SNR is desired, off-FPA adjustment cannot provide optimal weighting of the different pixel. When either of these issues becomes large enough it is desirable to have gain compensation for individual pixels within the array.

Note that on and off FPA alternatives are not mutually exclusive. The in-pixel compensation can be used to remove the bulk of the error, while the off-FPA compensation handles the residuals. At a minimum it is desirable to have a 1-bit gain on FPA, allowing dead or unusually noisy pixels to be excluded from the sum.

Roll and more generalized warping impose additional issues, largely because the N×N boxcar no longer reliably preserves resolved-source gain across the full-overlap portion of the FPA movement. In one embodiment, the in-FPA logic keeps track of this effect and either provides a compensation table or a compensated output. In the preferred approach, the FPA address mapping is known to the image receiver, along with the profile of applied motion over time, so that it may recalculate this result without addition I/O bandwidth or circuit complexity/heat load in the area of the imaging detector.

Figure 9:
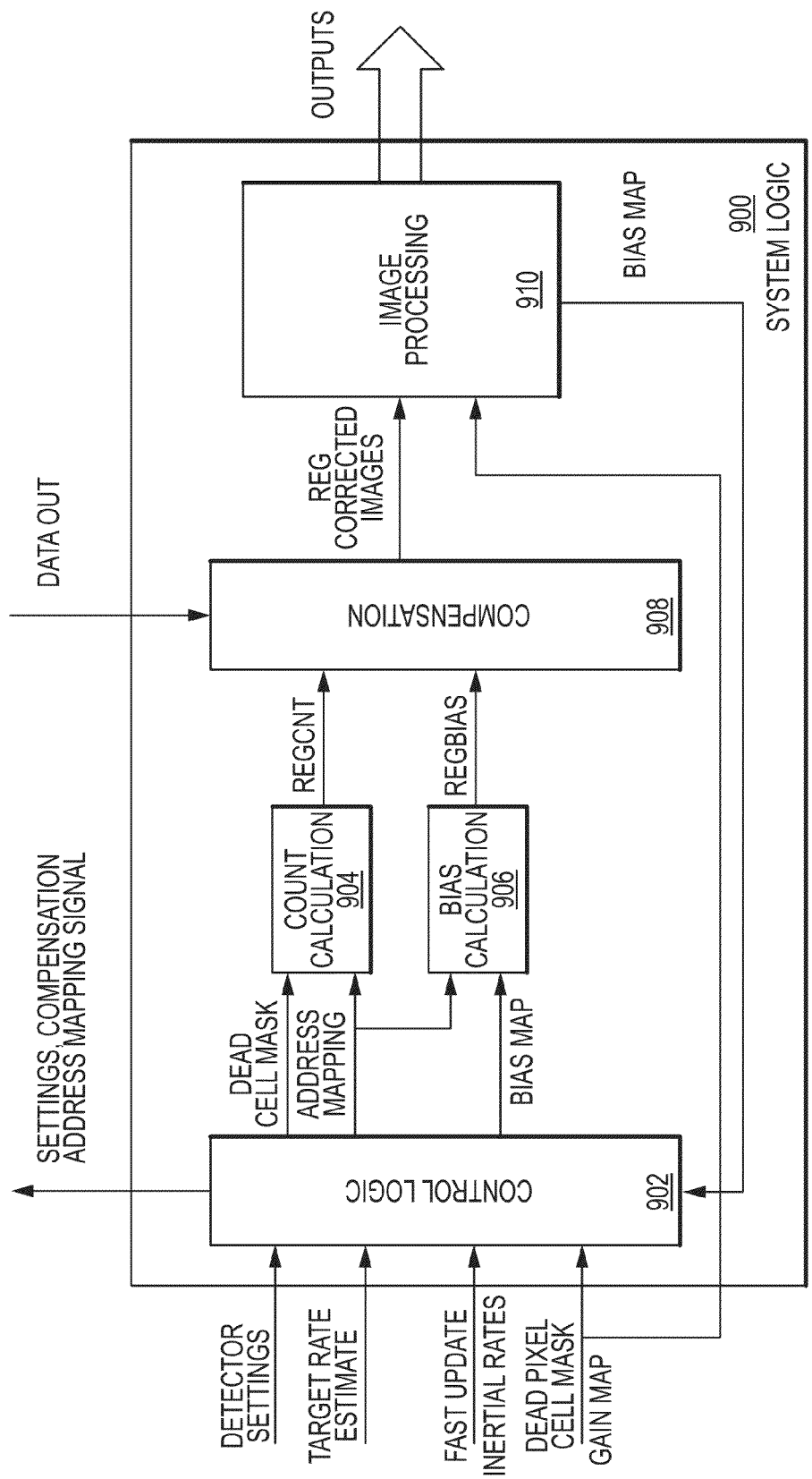
FIG. 9 is a block diagram illustrating the partitioning of stabilization calculations between the detector assembly and off-detector logic.

Referring now to FIG. 9, system efficiencies (computational, data transfer, and other) can be realized by computing and applying compensation terms such as pixel bias and pixel normalization in system logic 900 outside the detector assembly "off-chip". System logic 900 comprises control logic 902, count calculation 904, bias calculation 906, compensation 908 and imaging processing 910. System logic 900 receives as inputs detector settings, target rate estimate (inertial target rate) and fast update inertial rates (inertial platform rate) that define the motion of the scene across the detector (address mapping signal) and compensation inputs such as a dead pixel cell mask and a gain map. System logic 900 routes the settings, compensation and address mapping signals to the detector assembly and receives back the stabilized image data. System logic 900 compensates the image data to produce a NUCed registered average image as an output.

Control logic 902 receives the various inputs and routes the settings, compensation and address mapping signal to the detector assembly, routes a dead cell mask and address mapping signal to count calculation 904 and routes a bias map and the address mapping signal to bias calculation 906. Count calculation 904 sums an inverted dead-cell mask (a live pixel mask) across the address-mapping signal (motion) to produce a register count (REGCNT) for the memory locations in the digital memory, that is, to determine the number of time intervals (sub-frames with SF address mapping only) included in each location of the registered image. When address mapping is restricted to simple shilling this sum over the motion path is equivalent to convolving the motion path (quantized at the appropriate resolution for resolution enhancement) with the dead cell mask (zero in-filled to the appropriate resolution). Bias calculation 906 similarly sums the pixel bias map over the address-mapping signal (motion) to produce a registered bias (REGBIAS) for the memory locations in the digital memory. Again, in simple cases this sum reduced to a convolution. Compensation 908 uses the REGCNT to normalize the image data, converting the registered sums to registered average intensities so that DC response is preserved across the array, and adds REGBIAS, to remove pixel bias and NUC registered average image.

The resulting compensated image is provided to subsequent Image Processing 910 in the system, which is not part of this invention. That processing may provide a pre-calibrated bias map back to Control Logic 902, or may update the bias map dynamically. In some applications updated bias maps may be calculated by looking at internal sources while disabling the address mapping.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A read out circuit for an array of detector elements, said read out circuit comprising:
   an array of pixel cells, each of the pixel cells including:
      a storage device configured to accumulate a value in response to radiation impinging on a corresponding detector element;
      quantization circuitry configured to compare the accumulated value to a threshold value and generate a quantization event;
      a logical output configured to report the quantization event; and
      a compensator circuit configured to reduce the accumulated value on the storage device to account for the reported quantization event;
   at least one digital memory disposed physically separate from the array of pixel cells, said at least one digital memory comprising a plurality of addressable memory locations configured to store digital values;
   an address mapping input configured to receive updates to an address mapping signal during a frame integration interval, said updated address mapping signal providing a mapping between the pixel cells and the memory locations; and
   a control circuit disposed physically separate from the array of pixel cells, said control circuit including:
      a shared quantization event selector configured to identify the pixels for which a quantization event is reported and to initiate memory updates for those pixels;
      an address generator configured to determine a memory location for each memory update based on the updated address-mapping signal;
      memory update logic configured to modify the digital value of the corresponding memory location for each memory update; and
      output logic configured to output digital values accumulated over the frame integration interval from at least some of the memory locations.

2. The read out circuit of claim 1, wherein the address mapping signal represents motion of a scene with respect to the array of detector pixels such that a point in the scene maps to the same digital memory element as that point moves across the detector pixels over the frame integration period.

3. The read out circuit of claim 1, wherein the digital memory comprises quantization memory having a plurality of addressable memory locations configured to store and accumulate the digital values, wherein the address generator is configured to determine the memory location in the quantization memory for each update, wherein the memory update logic is configured to accumulate a digital value corresponding to the reported quantization event for the pixel cell into the accumulated digital value in the corresponding memory location in the quantization memory for each memory update, and wherein the output logic is configured to output the digital values accumulated over the frame integration interval from at least some of the memory locations in the quantization memory.

4. The read out circuit of claim 3, wherein the address generator is configured to apply only an isomorphic address mapping based on the updated address mapping signal to determine the memory location for each memory update.

5. The read out circuit of claim 3, wherein the quantization circuitry generates the quantization events at a quantization update rate, wherein the address mapping signal comprises a position and rate that are updated at a rate slower than the quantization update rate, wherein the address generator is configured to use the rate to extrapolate the position to provide a address mapping signal having a higher effective update rate to determine the memory location for each memory update.

6. The read out circuit of claim 1, wherein the frame integration interval is sub-divided into at least two sub-frame integration intervals, wherein the digital memory comprises quantization memory and frame memory each having a plurality of addressable memory locations, each said pixel cell being mapped to one or more memory locations in the quantization memory to store and accumulate a digital value corresponding to the reported quantization event for the pixel cell over each said sub-frame integration interval, wherein the address generator is configured to compute a sub-frame mapping from memory locations in the quantization memory to memory locations in frame memory to determine the memory locations in frame memory for each sub-frame integration interval, and wherein said memory update logic is configured to accumulate the digital values from quantization memory accumulated over the sub-frame integration interval to existing digital values at the corresponding memory locations in frame memory.

7. The read out circuit of claim 6, wherein the sub-frame address generator is configured to apply at least a non-isomorphic mapping.

8. The read out circuit of claim 6, wherein the address generator determines the memory locations in frame memory and said memory update logic accumulates the digital values to those memory locations in pixel sequence during read out, where addresses are calculated iteratively using values from address calculations earlier in the sequence.

9. The read out circuit of claim 6, wherein the quantization memory is configured to have at least a first portion and a second portion, where quantization events may be accumulated into one portion during a sub-frame while accumulated events from the previous sub-frame are being accumulated into the separately mapped frame memory.

10. The read out circuit of claim 6, wherein the address generator is configured to compute a quantization event mapping from pixel cells to memory locations in the quantization memory to determine the memory locations in quantization memory for each memory update, wherein said memory update logic is configured to accumulate the digital value for the corresponding pixel to existing digital value in the corresponding memory location in quantization memory over the sub-frame integration interval.

11. The read out circuit of claim 10, wherein the address generator is configured to implement quantization event mapping limited to only scaling by a value of at least 1 and a shift and to implement a non-isomorphic sub-frame mapping.

12. The read out circuit of claim 10, wherein the sub-frame mapping maps each pixel cell to a plurality of memory locations in frame memory for different sub-pixel alignments of the sub-frame mapping to achieve sub-pixel resolution enhancement.

13. The read out circuit of claim 1, wherein each pixel cell maps to a plurality of memory locations in the digital memory for different sub-pixel alignments of the pixel cell.

14. The read out circuit of claim 1, further comprising:
a read out integrated circuit (ROIC) chip that includes the array of pixel cells, the at least one digital memory, the address mapping input and the control circuit; and
a logic compensation circuit configured to receive as inputs the output digital values accumulated over the frame integration interval from at least some of the memory locations, process the updated address mapping signal to calculate a registered count for each memory location indicating a fraction of the frame integration interval over which pixel cells were accumulated into the memory location, and normalize the output digital values by their corresponding registered count to maintain an approximately constant gain over the memory locations.

15. The read out circuit of claim 1, further comprising:
a read out integrated circuit (ROIC) chip that includes the array of pixel cells, the at least one digital memory, the address mapping input and the control circuit; and
a logic compensation circuit configured to apply the updated address mapping signal to a bias map of the array of pixel cells to compute a registered bias for each memory location and to apply the registered bias to the digital values in the corresponding memory locations.

16. The read out circuit of claim 1, wherein the digital memory comprises quantization memory having a plurality of addressable memory locations, each said pixel cell being mapped to one or more memory locations in the quantization memory to store and accumulate a digital value corresponding to the reported quantization event for the pixel cell, said read out circuit further comprising an increment table that determines the digital value for a one-bit quantization event from each said pixel cell, enabling said digital values to vary across the array of pixel cells.

17. A read out circuit for an array of detector elements, said read out circuit comprising:
an array of M×m pixel cells, each of the pixel cells including:
a storage device configured to accumulate a value in response to radiation impinging on a corresponding detector element;
quantization circuitry configured to compare the accumulated value to a threshold value and generate a quantization event;
a logical output configured to report the quantization event; and
a compensator circuit configured to reduce the accumulated value on the storage device to account for the reported quantization event;
at least one digital memory disposed physically separate from the array of pixel cells, said at least one digital memory comprising a plurality of addressable memory locations configured to store an array of digital values, said array comprising at least (M×N)×(m×n) locations where at least one of N or n is greater than one;
an address mapping input configured to receive updates to an address mapping signal during a frame integration interval, said updated address mapping signal providing a mapping between the pixel cells and the memory locations; and
a control circuit disposed physically separate from the array of pixel cells, said control circuit including:
a shared quantization event selector configured to identify the pixels for which a quantization event is reported and to initiate memory updates for those pixels;
an address generator configured to determine a memory location for each memory update based on the mapping provided by the updated address-mapping signal, wherein each pixel is mapped to one of a plurality of memory locations for different sub-pixel alignments of the address mapping command to achieve sub-pixel resolution enhancement;
memory update logic configured to modify the digital value of the corresponding memory location for each memory update; and output logic configured to output digital values accumulated over the frame integration interval from at least some of the memory locations to output a digital image with sub-pixel resolution.

18. The read out circuit of claim 17, wherein the frame integration interval is sub-divided into at least two sub-frame integration intervals, wherein the digital memory comprises quantization memory and frame memory each having a plurality of addressable memory locations, at least said frame memory including the least (M×N)×(m×n), each said pixel cell being mapped to one or more memory locations in the quantization memory to store and accumulate a digital value corresponding to the reported quantization event for the pixel cell over each said sub-frame integration interval, wherein the address generator is configured to compute a sub-frame mapping from memory locations in the quantization memory to memory locations in frame memory to determine the memory locations in frame memory for each sub-frame integration interval, and wherein said memory update logic is configured to add the digital values from quantization memory accumulated over the sub-frame integration interval to existing digital values at the corresponding memory locations in frame memory.

19. A read out circuit for an array of detector elements, said read out circuit comprising:
a packaged device comprising:
an array of pixel cells, each of the pixel cells including:
a storage device configured to accumulate a value in response to radiation impinging on a corresponding detector element;
quantization circuitry configured to compare the accumulated value to a threshold value and generate a quantization event;
a logical output configured to report the quantization event; and
a compensator circuit configured to reduce the accumulated value on the storage device to account for the reported quantization event;
at least one digital memory disposed physically separate from the array of pixel cells, said at least one digital memory comprising a plurality of addressable memory locations configured to store digital values;
an address mapping input configured to receive updates to an address mapping signal during a frame integration interval, said updated address mapping signal configured to provide a mapping between the pixel cells and the memory locations; and
a control circuit disposed physically separate from the array of pixel cells, said control circuit including:
a shared quantization event selector configured to identify the pixels for which a quantization event is reported and to initiate memory updates for those pixels;
an address generator configured to determine a memory location for each memory update based on the updated address-mapping signal;
memory update logic configured to modify the digital value of the corresponding memory location for each memory update; and
output logic configured to output digital values accumulated over the frame integration interval from at least some of the memory locations, and
additional logic outside of the packaged device comprising,
first logic configured to receive as inputs the output digital values accumulated over the frame integration interval from at least some of the memory locations and process the updated address mapping signal to calculate a registered count for each memory location indicating a fraction of the frame integration interval over which pixel cells were accumulated into the memory location; and
second logic configured to apply the registered count to the digital values output from the first packaged device to normalize the output digital values.

20. The read out circuit of claim 19, wherein the first logic is configured to apply the updated address mapping signal to a bias map of the array of pixel cells to compute a registered bias for each memory location and the second logic is configured to apply the registered bias to the digital values in the corresponding memory locations.

* * * * *